United States Patent
Marschke et al.

(10) Patent No.: US 9,542,703 B2
(45) Date of Patent: Jan. 10, 2017

(54) VIRTUAL CUSTOM FRAMING EXPERT SYSTEM

(71) Applicant: Larson-Juhl Inc., Norcross, GA (US)

(72) Inventors: Mark Clarence Marschke, Suwanee, GA (US); James David Baker, Duluth, GA (US); Ginger Marissa Blisse Hartford, Dacula, GA (US); Brian Benjamin Maston, Bethlehem, GA (US); Molly O'Connell Montabert, Sandy Springs, GA (US); Paul Edward Noble, Cumming, GA (US); Ramanath Subramanian, Duluth, GA (US)

(73) Assignee: Larson-Juhl Inc., Norcross, GA (US)

( * ) Notice: Subject to any disclaimer, the term of this patent is extended or adjusted under 35 U.S.C. 154(b) by 571 days.

(21) Appl. No.: 14/138,225

(22) Filed: Dec. 23, 2013

(65) Prior Publication Data

US 2015/0149317 A1    May 28, 2015

Related U.S. Application Data

(60) Provisional application No. 61/909,627, filed on Nov. 27, 2013.

(51) Int. Cl.
*G06Q 30/00* (2012.01)
*G06Q 30/06* (2012.01)

(52) U.S. Cl.
CPC ...... *G06Q 30/0621* (2013.01); *G06Q 30/0631* (2013.01); *G06Q 30/0643* (2013.01)

(58) Field of Classification Search
CPC ............ G06Q 30/0621; G06Q 30/0631; G06Q 30/0643
(Continued)

(56) References Cited

U.S. PATENT DOCUMENTS

| 7,973,976 B2 | 7/2011 | Yamakado |
| 2003/0021468 A1* | 1/2003 | Jia ............................ G06T 7/408 382/162 |

(Continued)

FOREIGN PATENT DOCUMENTS

EP    2469473 A3    6/2012

OTHER PUBLICATIONS

Bassett, Kathie, Shop embraces trend toward personalized gifts, Feb. 7, 2011, McClatchy—Tribune Business News.*
(Continued)

*Primary Examiner* — Michael Misiaszek
*Assistant Examiner* — Brittney N Miller
(74) *Attorney, Agent, or Firm* — Thomas | Horstemeyer, LLP

(57) ABSTRACT

Disclosed are various embodiments for facilitating an electronic framing process. A virtual framing system may access a digital image provided by or otherwise selected by a user of the virtual framing system to be examined on a pixel-by-pixel basis to identify relevant and/or dominant colors located within the digital image. By utilizing the most relevant and/or the most dominant colors of the digital image, the virtual framing system may subsequently generate recommendations to be presented to the user by comparing the most relevant and/or most dominant colors to one or more predefined design templates, such as those created by an expert designer, that are stored in a data store.

23 Claims, 31 Drawing Sheets

(58) Field of Classification Search
USPC .................................... 705/26.5, 26.7, 27.2
See application file for complete search history.

(56) References Cited

U.S. PATENT DOCUMENTS

| | | |
|---|---|---|
| 2006/0155645 A1 | 7/2006 | Sainsbury-Carter et al. |
| 2006/0224585 A1* | 10/2006 | Brockmeier ........... G06Q 30/08 |
| 2007/0143082 A1* | 6/2007 | Degnan ................. G06T 11/60 |
| | | 703/1 |
| 2007/0174072 A1 | 7/2007 | King |
| 2012/0072179 A1* | 3/2012 | Patel ...................... G06F 17/50 |
| | | 703/1 |

OTHER PUBLICATIONS

Lifesaver Software, http://www.lifesaversoftware.com, retrieved May 14, 2014.
SpecialtySoft, http://www.specialtysoft.com/retail_sw.php, retrieved May 14, 2014.

* cited by examiner

Virtual Framing System

Select Your Art
coastal » blue » medium

Style
☐ abstract
☐ animal/ nature
☒ coastal
☐ decorative elements
☐ fashion/ figurative
☐ floral/ botanical
☐ kids
☐ kitchen/ bath
☐ home & office
☐ landscapes — 1003

Color
☐ red
☐ orange
☐ yellow
☐ black
☒ blue
☐ purple
☐ green
☐ brown
☐ neutral — 1006

Size
☐ small
☒ medium
☐ large — 1009 back

Art Title
item #
material
size

Art Title
item #
material
size

Art Title
item #
material
size

Art Title
item #
material
size

Art Title
item #
material
size

Art Title
item #
material
size

Art Title
item #
material
size

| Design Style | T | C | S | Tc | Ts | Ct | Cs | St | Sc | tcs | cts | sct |
|---|---|---|---|---|---|---|---|---|---|---|---|---|
| Traditional (T) | 3 | 0 | 0 | 2 | 2 | 1 | 0 | 1 | 0 | 1 | 1 | 1 |
| Contemporary (C) | 0 | 3 | 0 | 1 | 0 | 2 | 2 | 0 | 1 | 1 | 1 | 1 |
| Transitional (S) | 0 | 0 | 3 | 0 | 1 | 0 | 1 | 2 | 2 | 1 | 1 | 1 |

| Code | Design Style Preference | Description |
|---|---|---|
| T | Traditional | Traditional design preference |
| C | Contemporary | Contemporary design preference |
| S | Transitional | Transitional design preference |
| Tc | Traditional contemporary | Strong Traditional and slight Contemporary design preference |
| Ts | Traditional transitional | Strong Traditional and slight Transitional design preference |
| Ct | Contemporary traditional | Strong Contemporary and slight traditional design preference |
| Cs | Contemporary transitional | Strong Contemporary and slight transitional design preference |
| St | Transitional traditional | Strong Transitional and slight traditional design preference |
| Sc | Transitional contemporary | Strong Transitional and slight contemporary design preference |
| tcs | traditional contemporary transitional | Equal preference for traditional, contemporary & transitional designs |
| cts | | |
| sct | | |

| Design Criterion | Weight | Description | Moulding | Fillet | Matboard | Liner | Glazing |
|---|---|---|---|---|---|---|---|
| Image Size | 10 | Width and height dimensions of image | T | T | T | F | F |
| Image Material | 10 | Canvas or paper | F | T | T | F | T |
| Stretched | 10 | Standard, Gallery, None | T | F | F | T | F |
| Substrate | 10 | Canvas, Paper, Mirror, Needle Art | F | T | T | T | T |
| Genre | 9 | Pastel, Watercolor, Reproduction, Poster, Charcoal, Drawing, Oil, Acrylic, Limited Edition, Photography | F | F | T | T | T |
| Color Scheme | 9 | Photography – Color, Sepia, Black & White; Art – Monochromatic, Achromatic, Complimentary | T | T | T | F | T |
| Historical Designs | 9 | List of previous designs purchased by consumer | T | T | T | T | T |
| Design Style | 8 | Design style: traditional, contemporary, transitional | T | T | F | T | F |
| Design Concepts | 8 | Monochromatic, Achromatic, Complimentary | F | F | T | T | F |
| Margin | 8 | Margin of custom frame design | T | T | T | T | T |
| Image Category | 7 | Art, photo, sample, memorabilia, brushstrokes | F | F | F | F | F |
| Location | 5 | Location of custom frame (living room, den, family room/great room, bedroom, foyer/hallway, stairway, office, dining room, kitchen, laundry room, basement, nursery, child's room, game room, garage, bar, bathroom, etc.) | F | F | F | F | T |
| Spatial consideration | 3 | Mantle, Bathroom, Console, Bed/Headboard, Entry Space, Sofa, Narrow hallway | T | T | T | T | T |
| Wall color | 2 | Color of wall custom frame will hang | T | F | T | F | F |
| Price Range | 5 | Cost of custom frame design | T | T | T | T | T |
| Geographic Region | 5 | Design style per geographic region | T | F | F | F | F |
| Highest Score | Score | Highest "Design Fit" value based on a score of 10 for all criteria | T | T | T | T | T |

```
/*
 * Determine Mat Board Quantity
 */
If Canvas Then
        Mat_Board_Quantity = 0
Else If Image_Size > 40x60 Then
        Mat_Board_Quantity = 0
Else If Image_Size > 32x40 AND
<= 40x60 Then
        Mat_Board_Quantity = 2
Else If Image_Size <= 32x40
Then
        Mat_Board_Quantity = 3
```

FIG. 27

```
/*
 * Determine Mat Board Width
 & Reveals
 */
Switch (Mat_Board_Quantity)
{

Case 0:
        Break;
Case 2:
        Top_Mat
                Outer_Mat = 3;
                Inner_Mat = .375;
        Bottom_Mat
                Outer_Mat = 3;
                Inner_Mat = .375;
        Break;
Case 3:
        Outer_Mat Inner_Mat
        Outer_Mat = 3;
        Inner_Mat = .375;
        Break;
```

FIG. 28

```
/*
 * Determine Mat Board SKU
 */
Switch (Image_Type) {
      Case Sample:
            Monochromatic_Mats(); /* 1 - neutral, 2 - double neutral, 3 -
      double neutral + focal */
            Achromatic_Mats(); /* 1 - neutral, 2 - neutral + accent, 3 -
      neutral + accent + focal */
            Complimentary_Mats(); /* 1 - neutral, 2 - neutral + focal, 3 -
      neutral + accent + focal */
            Break;
      Case Pastel:
            Pastel_Mats(); /* 1 - neutral, 2 - neutral + focal, 3 -
      neutral + accent + focal */
            Break;
      Case WaterColor:
            Linen_Mats();/* 1 - neutral, 2 - neutral + focal, 3 - neutral
+ accent + focal */
            Break;
      Default: /* use color detect */
            Image_Colors();
            Neutral_Mats();
            Focal_Mats();
            Accent_Mats();
            Break;
}
```

FIG. 29

VIRTUAL CUSTOM FRAMING EXPERT SYSTEM

CROSS-REFERENCE TO RELATED APPLICATIONS

This application claims the benefit of and priority to co-pending U.S. Provisional Application Ser. No. 61/909,627 entitled "Electronic Custom Framing System," filed Nov. 27, 2013, the entire contents of which is hereby incorporated herein by reference.

BACKGROUND

Custom framing is the process of placing an item, such as a piece of artwork, a mirror, a diploma, etc., in a frame with or without decorative additions. Decorative additions may include items commonly used in custom framing such as mouldings, matboards, glazings, fillets, liners, etc. In many instances, a customer of a traditional custom framing store is unable to preview how a particular item, such as a piece of artwork, may look with respect to various frames or decorative additions without creating a completed frame product. It is most challenging for consumers to understand how to custom frame with the myriad options available, what materials and colors best suit specific art styles and how to confidently create the best design. Moreover, it remains problematic for the customer to visualize how a completed custom frame design may look in a respective room or location.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 3-20 are pictorial diagrams of example user interfaces rendered by a client device in the networked environment of FIG. 2 according to various embodiments of the present disclosure.

FIGS. 25-26 are tables illustrating exemplary weight methodologies that may be employed by the virtual framing system in generating recommendations according to various embodiments of the present disclosure.

FIGS. 27-29 are drawings depicting pseudo-code that may be employed by the virtual framing system in generating recommendations according to various embodiments of the present disclosure.

DETAILED DESCRIPTION

Figure 1:
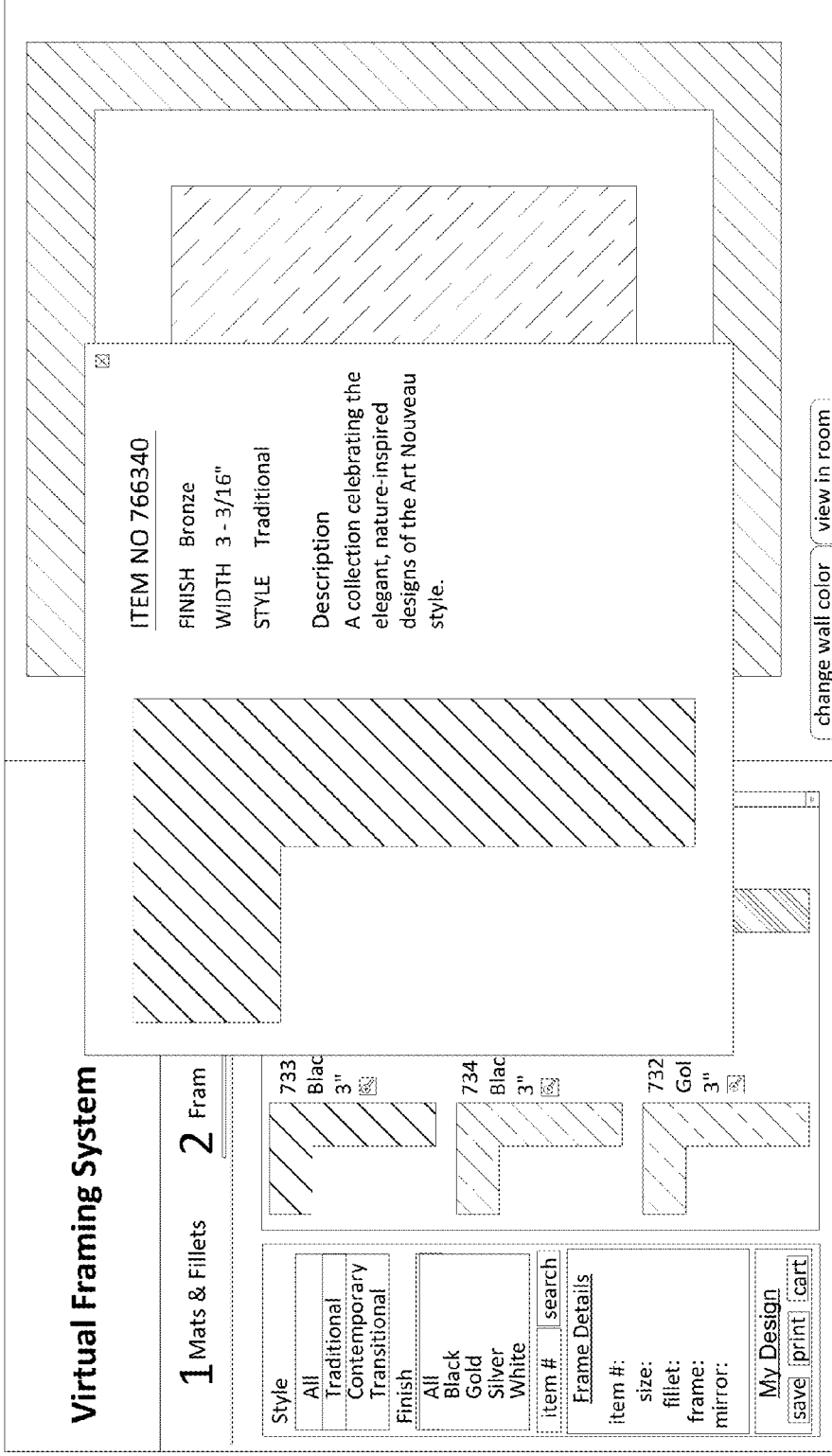
FIG. 1 is a diagram of an example user interface rendered by a client device according to various embodiments of the present disclosure.

Custom framing is the process of placing an item, such as a piece of artwork, a mirror, a diploma, etc., in a frame with or without decorative additions. Decorative additions may include items commonly used in custom framing such as mouldings, matboards, glazings, fillets, liners, etc. In many instances, a customer of a traditional custom framing store is unable to preview how a particular item, such as a piece of artwork, may look with respect to various frames or decorative additions without creating a completed frame product. Moreover, it remains problematic for the customer to visualize how a completed framing may look in a respective room or location.

Consequently, it is beneficial for a virtual framing system to generate custom framing visualizations that may be useful to a customer during the purchase of a frame. According to various embodiments, a virtual framing system may access a digital image provided by or otherwise selected by a user of the virtual framing system. The colors of the digital image may be examined on a pixel-by-pixel basis to identify unique colors located within the digital image. The colors identified in the digital image may be ranked to identify which of the plurality of colors meet a predefined threshold indicating which colors are the most relevant and/or most dominant colors in the digital image. By utilizing the most relevant and/or the most dominant colors of the digital image, the virtual framing system may subsequently generate design material recommendations to be presented to the user by comparing the most relevant and/or most dominant colors, combined with an expert style reference, to one or more predefined best design templates stored in a data store such as computer memory. The recommendations may include, for example, particular choices or combinations of mouldings, matboards, glazings, fillets, liners, etc., as will be discussed in greater detail below. According to various embodiments, a companion relationship between the moulding, the matboard, the glazing, the fillet, and the liner may be used in generating the recommendation. For example, a companion fillet may be recommended to a user based on a selection of a particular matboards made by the user.

The recommendations generated by the virtual framing system may be encoded in one or more user interfaces such as a network page or a mobile application. The user interface, or data used in generating the user interface, may be sent to a client device, such as a computer or mobile device, for rendering. According, the virtual framing system facilitates a custom frame design process by weighing numerous design options per a type of art and customer preferences. The virtual framing system provides a network-based computer expert system for custom framing that guides a consumer through an interactive design process of evaluation, collaboration, and selection. In addition, it allows the consumer to browse suggested design templates and educates the consumer with best design tips, best classes of products, best prices, and/or other product information.

In the following discussion, a general description of the virtual framing system and its components is provided, followed by a discussion of the operation of the same.

With reference to FIG. 1, shown is a diagram of an example user interface rendered by a client device, such as a personal computer or a mobile device, according to various embodiments of the present disclosure. In the non-limiting example of FIG. 1, custom framing visualizations may be rendered on the client device of a user during the customization and purchase of a frame. According to various embodiments, a virtual framing system may access a digital image provided by or otherwise selected by a user of the virtual framing system. Various colors identified in the digital image may be ranked to identify which of the plurality of colors meet a predefined threshold indicating which colors are the most relevant and/or most dominant colors in the digital image. By utilizing the most relevant and/or the most dominant colors of the digital image, the virtual framing system may subsequently generate recommendations, such as the frames depicted in FIG. 1, to be presented to the user by comparing the most relevant and/or most dominant colors to one or more predefined design templates stored in a data store. The recommendations may include, for example, particular choices or combinations of mouldings, matboards, glazings, fillets, liners, etc., as will be discussed in greater detail below.

Figure 2:
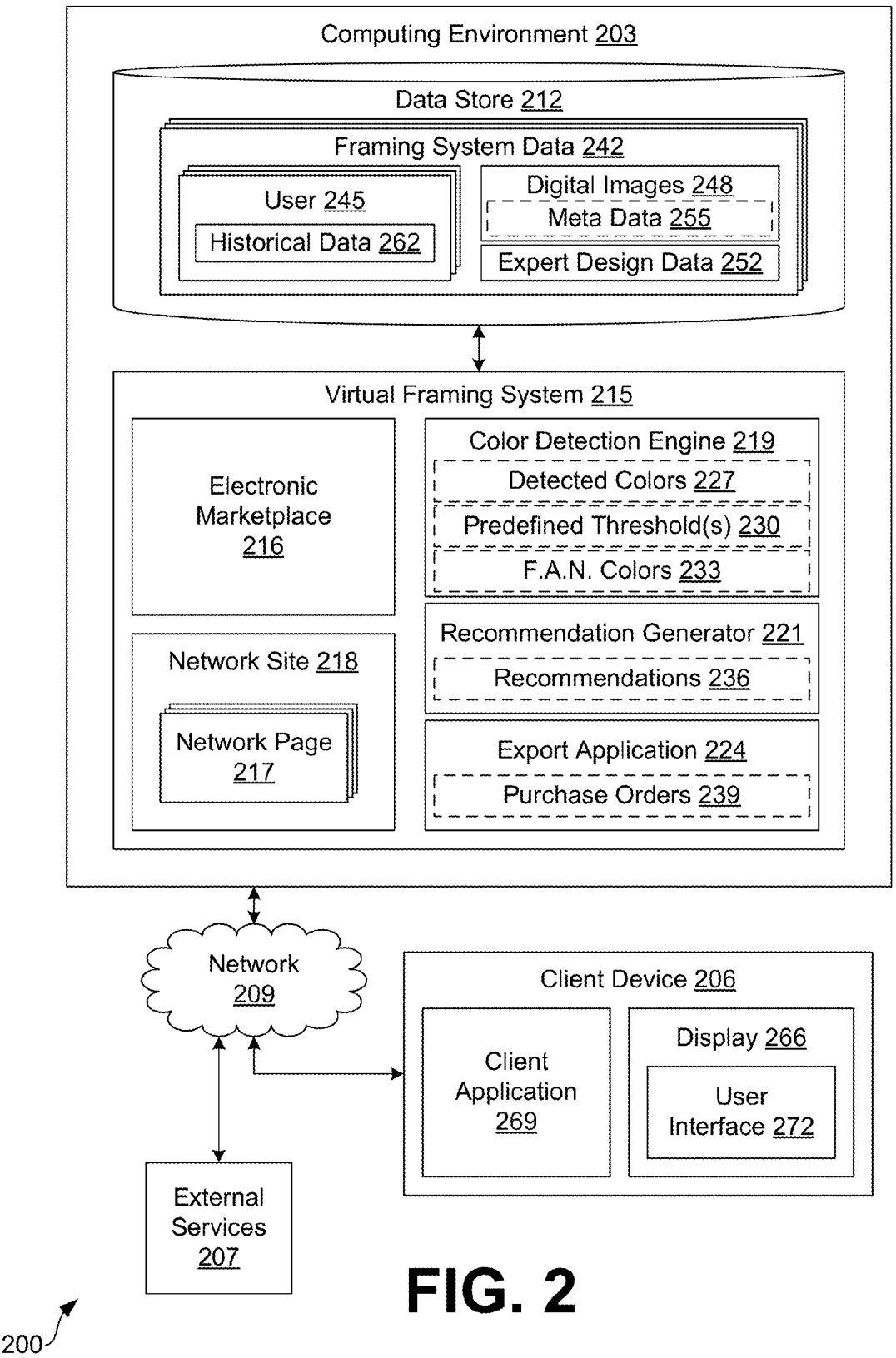
FIG. 2 is a drawing of a networked environment according to various embodiments of the present disclosure.

With reference to FIG. 2, shown is a networked environment 200 according to various embodiments. The networked environment 200 includes a computing environment 203, a client device 206, and one or more external services 207, which are in data communication with each other via a network 209. The network 209 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 203 may comprise, for example, a server computer or any other system providing computing capability. Alternatively, the computing environment 203 may employ a plurality of computing devices (not shown) that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a virtual framing system 215, a color detection engine 219, a recommendation generator 221, an export application 224, and other applications, services, processes, systems, engines, or functionality not discussed in detail herein.

The virtual framing system 215 is executed to receive and/or access one or more digital images provided by or otherwise selected by a user of the virtual framing system 215. In addition, the virtual framing system 215 is executed in order to facilitate the online purchase of a customized frame over the network 209 via an electronic marketplace 216. In addition, the virtual framing system 215 may be executed in order to facilitate the purchase of a customized frame via in person, such as in a store or at a kiosk, or via e-mail, facsimile, SMS, or phone. The virtual framing system 215 also performs various backend functions associated with the online presence of a merchant in order to facilitate the online purchase of customized frames as will be described. For example, the virtual framing system 215 generates network pages 217 such as web pages accessible of a network site 218 or other types of network content that are provided to client devices 206 for the purposes of customizing frames for purchase.

The color detection engine 219 is configured to examine a digital image to identify colors located within the digital image. The colors identified in the digital image (detected colors 227) may be ranked by the virtual framing system 215 to identify which of the plurality of colors meet a predefined threshold 230 indicating which colors are the most relevant and/or most dominant colors in the digital image. The most relevant or dominant colors may be categorized by a type of the colors via the color detection engine 219. According to one embodiment, the type of colors may be categorized as focal, accent, and/or neutral (FAN) colors 233 although it is understood that additional categorizations may be employed.

The recommendation generator 221 is executed to generate recommendations 236 to be presented to the user by comparing the most relevant and/or most dominant colors to one or more predefined design expert templates stored in a data store. Accordingly, the recommendations 236 may comprise expert desgin recommendations for best practices in customizing a frame. The recommendations 236 may include, for example, particular choices or combinations of mouldings, matboards, glazings, fillets, liners, machine-readable visual identifiers, LED devices, etc., based on user input provided to the virtual framing system 215, the digital image provided to the virtual framing system 215, and/or other factors, as will be discussed in greater detail below.

The export application 224 is executed to export data from the virtual framing system 224 according to one or more predefined formats. In addition, the export application 224 is configured to generate one or more purchase orders 239 respective of a fulfillment party automatically determined for a user or selected by the user. The purchase orders 239 may comprise, for example, data corresponding to a finalized frame customization process, such as item numbers, colors, sizes, specifications, etc. for particular choices or combinations of mouldings, matboards, glazings, fillets, liners, etc., defined by the user during a customization process. The purchase orders 239 may be generated purchase order documents that may be sent to fulfillment parties for fulfillment of construction of the customized frame. In addition, the purchase orders 239 may be generated according to electronic data interchange (EDI) standards provided by or otherwise stored in association with a respective fulfillment party.

Fulfillment parties may comprise, for example, virtual partners associated with the virtual framing system 215 that may fulfill purchases generated by the users of the virtual framing system 215. Thus, according to various embodiments, after completion of a customized framing process, a user may be prompted to select a fulfillment party based on a proximity of the fulfillment party to the user and/or an estimated cost of the fulfillment. For example, the user may be prompted to provide a zip code in which the user resides.

The virtual framing system 215 may determine the frame shops located with a certain distance of the zip code and may present a list of the frame shops to the user along with an estimate of the fulfillment for each of the frame shops. A purchase order may be generated according a selected on the frame shops within the list. The purchase order may be generated according to a predefined format identified by the selected frame shop and stored in data store 212.

The data stored in the data store 212 includes, for example, framing system data 242, and potentially other data, that may be utilized during a customization process whereby a user customizes a frame for purchase. Framing system data 242 may comprise, for example, user data 245, digital image data 248, and expert design data 252. User data 245 may comprise, for example, data used in generating recommendations, authentication data, etc., based on historical data 262 provided by a user in associated with the use of the virtual framing system 215, such as historical data corresponding to the user associated with one or more prior customizations of one or more prior virtual frames generated by the user. Digital image data 248 may comprise, for example, predefined artwork made available by the virtual framing system 215. In addition, digital image data 248 may comprise, for example, digital images provided by the user during a frame customization process. Each digital image in the digital image data 248 may be associated with meta data 255 that may be used in generating recommendations 236 to the user. Meta data 255 may comprise, for example, information located a digital image file (e.g., in a header of the digital image) such as a location the image was captured, a time the image was captured, the image resolution, an orientation of the image (landscape or portrait), a style of art of the digital image, a color palette of the digital image, art media and/or substrate, etc.

Expert design data 252 may comprise, for example, predefined design templates and best design practices that may be employed in generating recommendations for a user, such as best design recommendations. For example, particular FAN colors 233 may be identified in a digital image provided by a user during a frame customization process. According to the FAN colors, certain colors, sizes, textures, etc. of frames, mats, or fillets, may be recommended to the user according to a predefined design style stored as expert design data 252. As styles tend to change, the expert design data 252 may be updated with up-to-date style recommendations without affecting the functionality of the virtual framing system 215.

The client device 206 is representative of a plurality of client devices that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, "smart" devices such as "Smart TVs," kiosk computing devices, scrolling marquee devices, or other devices with like capability. According to various embodiments in which the client device 206 comprises a marquee device, such as a scrolling marquee device, the marquee device may be configured to display, utilizing audio or video in association with a user interface, an advertising for a plurality of predefined custom frame combinations, a tutorial for a plurality of best design concepts, and advertising for a plurality of new product designs, each of which may be accessed from the data store 212. The client device 206 may include a display 266. The display 266 may comprise, for example, one or more devices such as liquid crystal display (LCD) displays, gas plasma-based flat panel displays, organic light emitting diode (OLED) displays, electrophoretic ink (E ink) displays, LCD projectors, touch screen displays, or other types of display devices, etc.

The client device 206 may be configured to execute various applications such as a client application 269 and/or other applications. The client application 269 may be executed in a client device 206, for example, to access network content served up by the computing environment 203 and/or other servers, thereby rendering a user interface 272 on the display 266. To this end, the client application 269 may comprise, for example, a browser, a dedicated application, etc., and the user interface 272 may comprise a network page 217, an application screen, etc. According to various embodiments, a dedicated application may comprise, for example, an application configured to be executed on the Android® operating system (Android), the iPhone® operating system (iOS), the Windows® operating system, or similar operating systems. The client device 206 may be configured to execute applications beyond the client application 269 such as, for example, email applications, social networking applications, word processors, spreadsheets, and/or other applications.

Next, a general description of the operation of the various components of the networked environment 200 is provided. To begin, the virtual framing system 215 may access a digital image provided by or otherwise selected by a user of the virtual framing system 215. In a non-limiting example, an application accessible by a user, such as a mobile application executable on a mobile device, may comprise a color detection engine comprising a variety of color matboard assortments determined from an uploaded or photographed digital image. In another non-limiting example, a user interface 272 in a frame customization process may be generated to prompt a user for a digital image, as will be discussed in greater detail below. The colors of the digital image may be examined on a pixel-by-pixel basis to identify unique colors located within the digital image. The colors identified in the digital image may be ranked to identify which of the plurality of colors meet a predefined threshold indicating which colors are the most relevant or dominant colors in the digital image. By utilizing the most dominant colors of the digital image, the virtual framing system may subsequently generate recommendations, such as expert design recommendations, to be presented to the user by comparing the most dominant colors to one or more predefined design templates that may be stored in a data store or like memory.

Further, the recommendations may be based at least in part on user input provided during the customization process, such as a treament of art (e.g., watercolor, charcoal, photography), the style of the art (e.g., traditional, contemporary, transitional), a medium on which the art is printed (e.g., canvas), user preferences determined utilizing a style quiz (e.g., user preferences towards monochromatic, achromatic, and/or complimentary designs), a size of the art, a condition of the art, and/or other information. The recommendations may include, for example, particular choices or combinations of mouldings, matboards, glazings, fillets, liners, etc., and/or colors and textures thereof, for presentation to the user as will be discussed in greater detail below.

The recommendations generated by the virtual framing system 215 may be encoded in one or more user interfaces 272 such as a network page 217 or a client application 269. The user interface 272, or data used in generating the user interface 272, may be sent to the client device 206, such as a computer or mobile device, for rendering.

Figure 3:
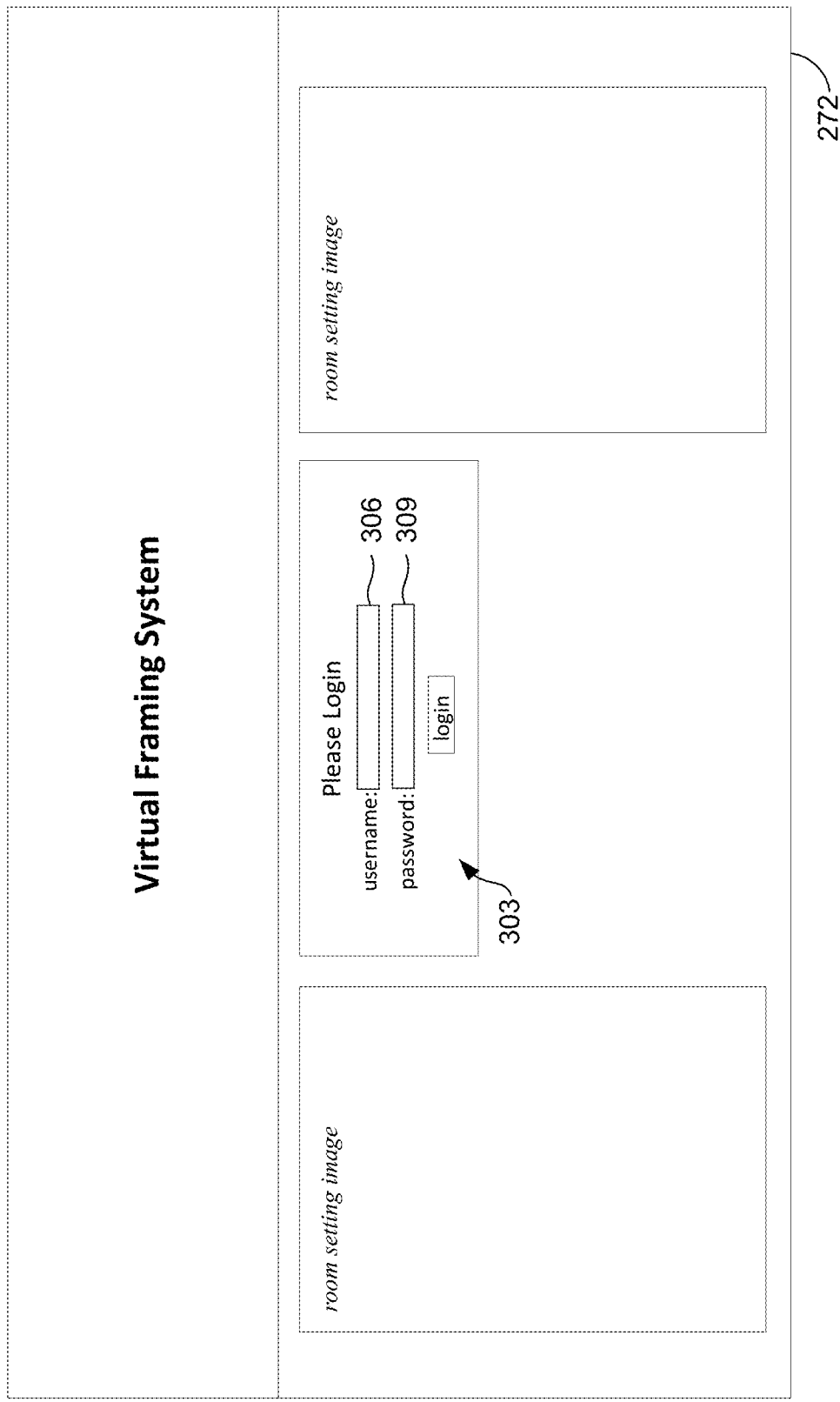

Referring next to FIG. 3, shown is a pictorial diagram of an example user interface 272 rendered by a client device 206 (FIG. 2) in the networked environment 200 of FIG. 2 according to various embodiments of the present disclosure. As discussed above, it is beneficial for the virtual framing system 215 (FIG. 2) to generate custom framing visualizations that may be useful to a customer during a purchase of a frame. It may be beneficial to authenticate a user prior to granting the user access to the virtual framing system 215 although authentication of the user may be optional in various embodiments. Accordingly, in FIG. 3, an authentication component 303 may be utilized to authenticate a user by prompting the user to provide various authentication information. In the non-limiting example of FIG. 3, a user may be prompted for a username and a password utilizing, for example, a username field 306 and a password field 309. Although the user interface 272 of FIG. 3 is configured to authenticate a user utilizing at least a username and password, the present disclosure is not so limited. For example, authentication may be based at least in part on a user's internet protocol (IP) address, biometric data, network cookies, etc.

Figure 4:
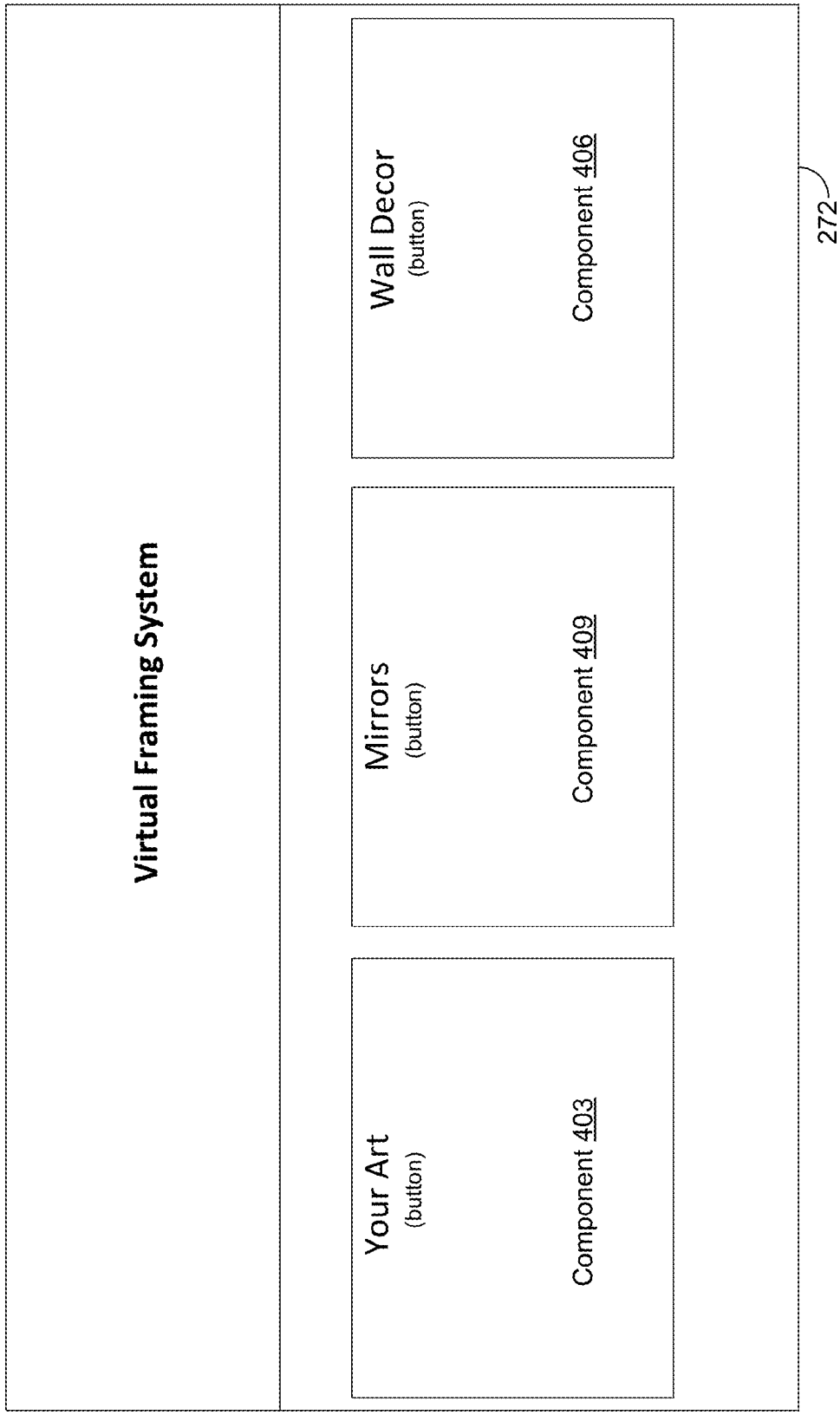

Turning now to FIG. 4, shown is a pictorial diagram of an example user interface 272 rendered by a client device 206 (FIG. 2) in the networked environment 200 of FIG. 2 according to various embodiments of the present disclosure. As discussed above, the virtual framing system 215 may access a digital image provided by or otherwise selected by a user of the virtual framing system. Accordingly, a user may be prompted to determine whether to provide a digital image or to select an image from one or more predefined images. In the non-limiting example of FIG. 4, a user may engage component 403 which may initiate a rendering of one or more user interfaces 272 that are configured to facilitate an ingestion process whereby a user provides the virtual framing system 215 with a digital file, as will be discussed in greater detail below with respect to FIG. 5. For example, a user may be prompted to upload a digital image locally stored on the user's computer (e.g., the client device 206).

Alternatively, the user may engage a component 406 to initiate a rendering of one or more user interfaces 272 that are configured to assist the user in making a selection of a predefined piece of art accessed from the data store 212, as will be discussed in greater detail below. In certain scenarios, the user may desire to purchase a frame for a mirror as opposed to a frame for a piece of artwork. By engaging component 409, a rendering of one or more user interfaces 272 that are configured to assist the user in making a selection of a mirror may be initiated.

Figure 5:
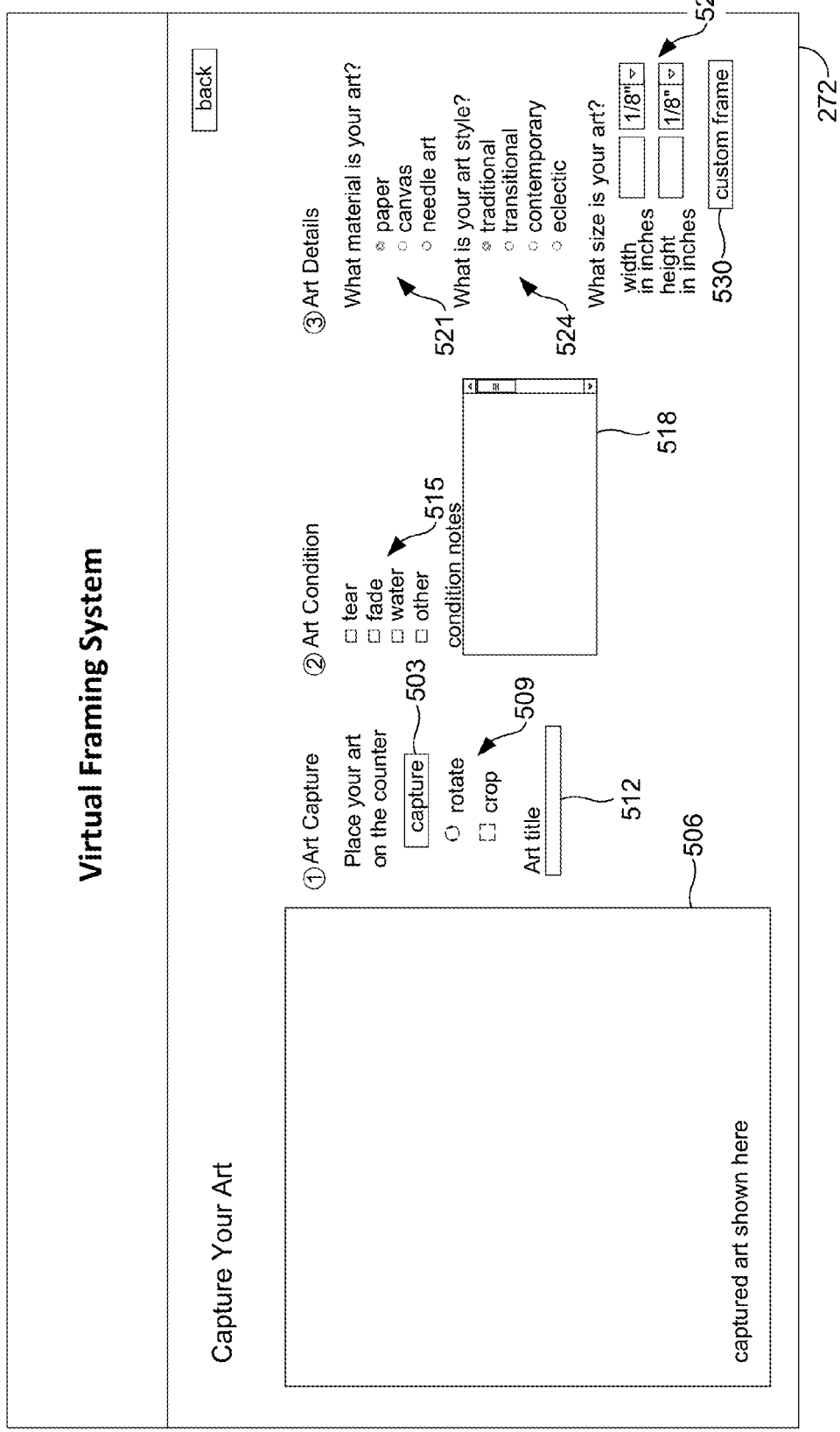

Moving on to FIG. 5, shown is a pictorial diagram of an example user interface 272 rendered by a client device 206 (FIG. 2) in the networked environment 200 of FIG. 2 according to various embodiments of the present disclosure. As discussed above with respect to FIG. 4, a user may be prompted to determine whether the user desires to provide a digital image to generate a customized frame for the digital image. For example, in the event a user has indicated the desire to provide a digital image (e.g., by engaging component 403 in FIG. 4), the user interface 272 of FIG. 5 may subsequently be rendered. In the non-limiting example of FIG. 5, a user may engage component 503 which may initiate a capture of the digital image although the digital image may otherwise be uploaded if the digital image already exists. By engaging the capture component 503, a process may be initiated whereby the user captures the digital image of the art utilizing, for example, a capture device such as a webcam, digital camera, tablet camera, phone camera, etc.

In the event the user has successfully provided the digital image via the capture device (or via an upload if the digital image was preexisting), the digital image may be dynamically rendered in the visualization region 506 utilizing asynchronous javascript and extensible markup language (AJAX) or similar technology.

The successful provision of the digital image by the user may enable further features in the user interface 272 of FIG. 5. For example, a customization component 509 may facilitate a modification of the digital image by providing the user with the ability to rotate or crop the digital image. Further, the user may provide a title of the digital image using a title field 512. The title of the digital image may be used, for example, in accessing a saved framing process in future framing sessions, as will be discussed in greater detail below.

A condition field 515 may prompt a user to provide a condition of the digital image that may be used in generating recommendations for particular frames, mouldings, matboards, glazings, fillets, liners, etc. For example, a user may provide via the condition field 515 whether the art subject of the digital image comprises a tear, a fade, a water coloring, etc. A condition notes field 518 may grant the ability to provide customized notes that may be saved in association with the digital image and/or the framing process. The condition notes provided by the user via the condition notes field 518 may be used, for example, in accessing a saved framing process in future framing sessions.

Further, the user may be prompted to provide a material and an art style of the art subject to the digital image via a materials component 521 and an art style component 524, respectively. A size component 527 may prompt the user to provide an existing or desired size of the art subject of the digital image. For example, the size component 527 may be configured to permit the user the ability to define a width and/or a height according to a respective metric. According to various embodiments, the size component 527 may be configured to maintain scale ratios according to the digital image provided to the virtual framing system 215. Accordingly, a custom frame component 530 may be engaged by the user to initiate the rendering of one or more additional user interfaces to provide custom frame dimensions.

Figure 6:
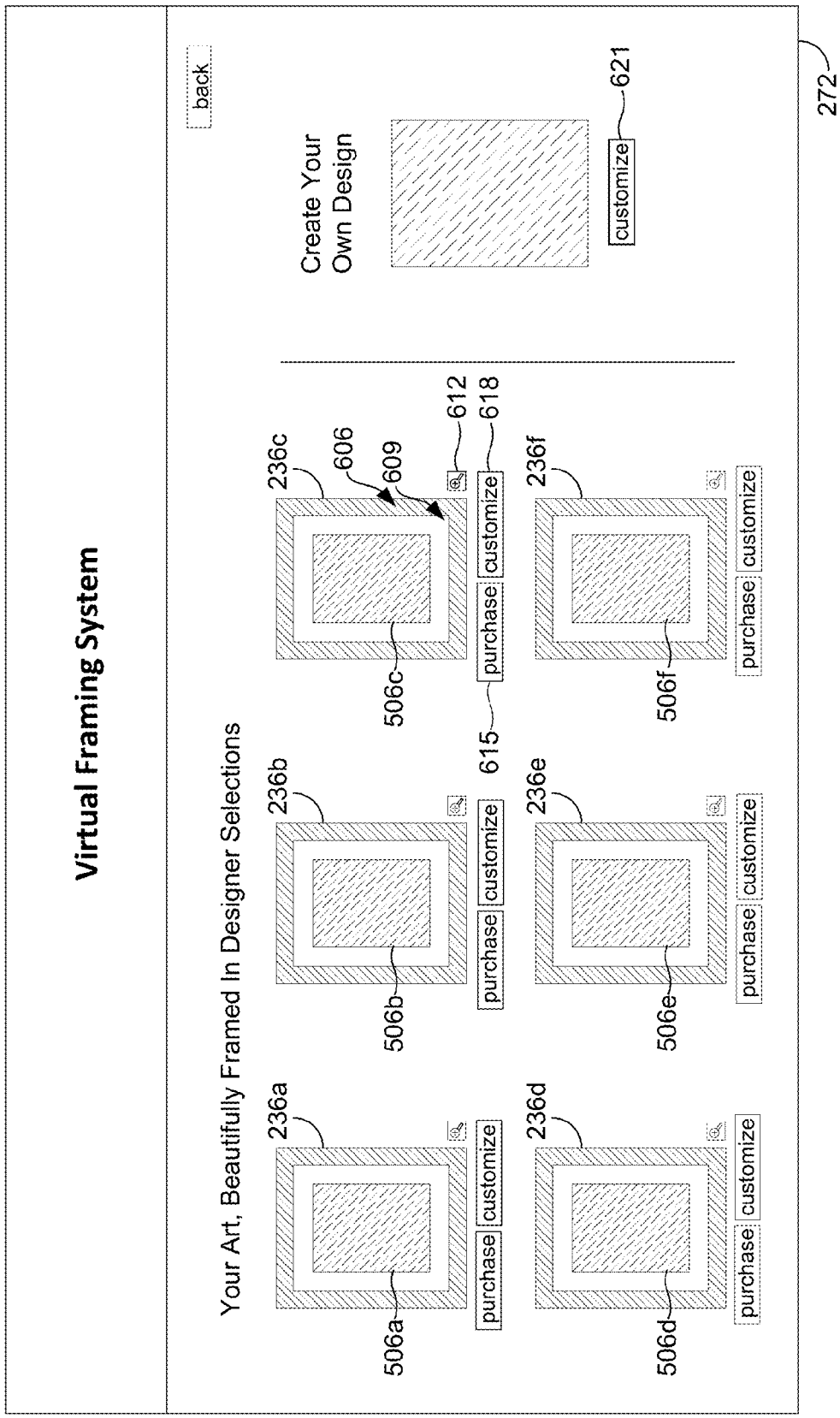

Referring next to FIG. 6, shown is a pictorial diagram of an example user interface 272 rendered by a client device 206 (FIG. 2) in the networked environment 200 of FIG. 2 according to various embodiments of the present disclosure. In the non-limiting example of FIG. 6, a plurality of recommendations 236a, 236b, 236c, 236d, 236e, and 236f may be generated by the virtual framing system 215 (FIG. 2) according to at least the user input provided via the user interface 272 of FIG. 5.

As discussed above, the colors of the digital image may be examined on a pixel-by-pixel basis to identify unique colors located within the digital image. The colors identified in the digital image may be ranked to identify which of the plurality of colors meet a predefined threshold indicating which colors are the most relevant and/or most dominant colors in the digital image. By utilizing the most relevant colors of the digital image, the virtual framing system 215 may generate recommendations 236 to be presented to the user by comparing the most relevant and/or most dominant colors to one or more predefined best design templates that may be stored in a data store. The recommendations may include, for example, particular choices or combinations of mouldings, matboards, glazings, fillets, liners, etc. In the non-limiting example of FIG. 6, the generated recommendations 236*a-f* comprise, for example, a frame 606, a mat 609, as well as the digital image provided by the user. A zoom component 612 may facilitate an increase of a size of the recommendation 236 in the user interface 272 for a better inspection by the user.

In the event a user desires to purchase one of the recommendations 236, such as a best design recommendation, the user may engage a purchase component 615 that may initiate the rendering of one or more additional user interfaces 272 that conduct a checkout process, as will be discussed in greater detail below. Alternatively, the user may desire to further customize a respective recommendation 236 by engaging the customize component 618 that may generate one or more additional user interfaces 272 that facilitate the customization of the respective recommendation 236, as will be discussed in greater detail with respect to FIGS. 7A-B and FIGS. 14-25. Similarly, if a user desires to create a new design independent of one of the generated recommendations 236, the user may engage an alternative customize component 621 that facilitates the customization of a frame, as will be discussed in greater detail with respect to FIGS. 7A-B and FIGS. 14-25.

Figure 7A:
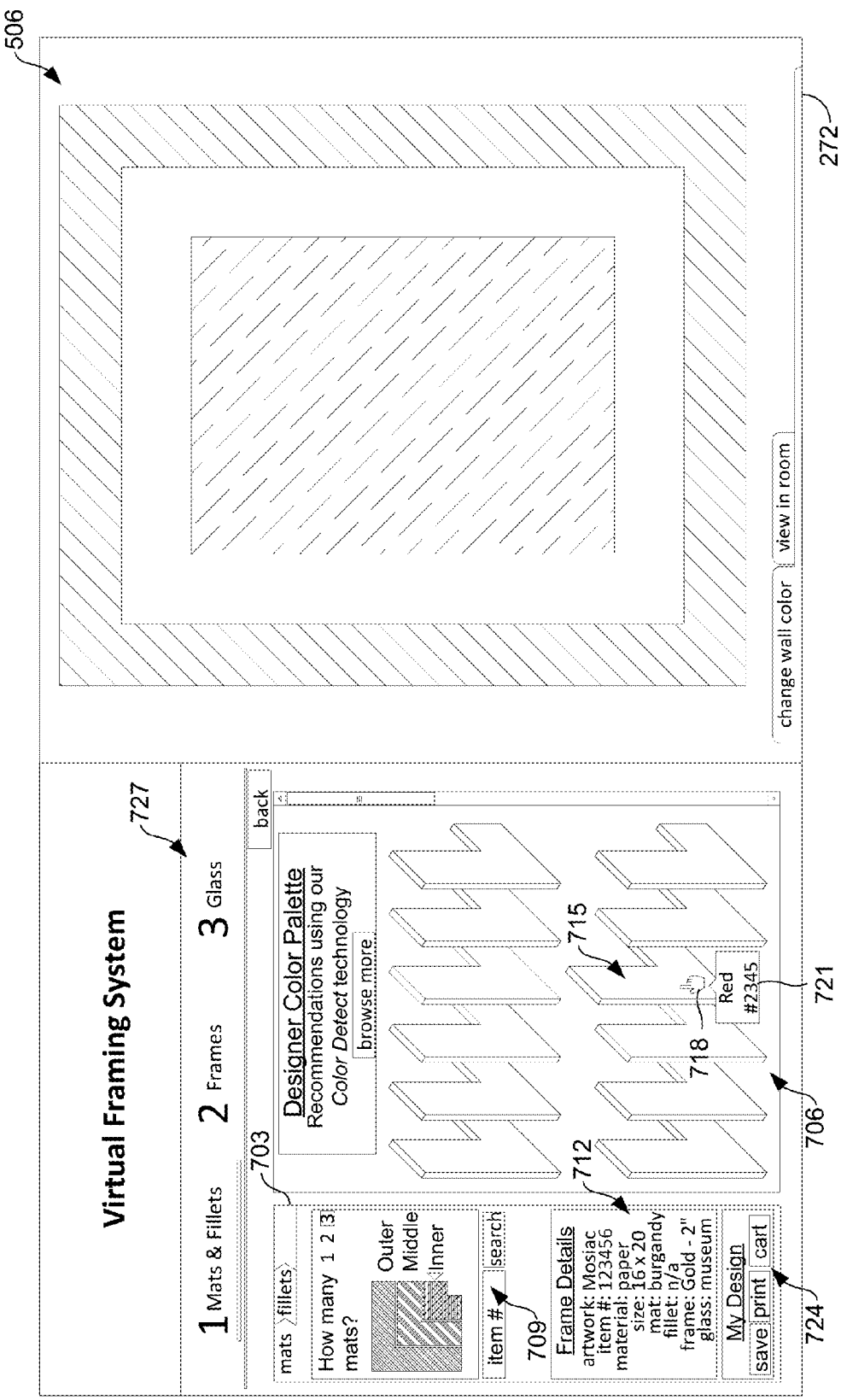

Turning now to FIG. 7A, shown is a pictorial diagram of an example user interface 272 rendered by a client device 206 (FIG. 2) in the networked environment 200 of FIG. 2 according to various embodiments of the present disclosure. In the non-limiting example of FIG. 7A, the user interface 272 may be configured to customize a selection of a mat, if desired by the user during a customization process. A visualized mat and fillet region 703 may facilitate the navigation between respective mat or fillet options during the customization process of a user. For example, the user may have indicated that the user would like up to three mat options during his or her customization process. Accordingly, the visualized mat and fillet region 703 may generate up to three mat or fillet options that, when engaged, facilitate a selection of a respective mat or fillet for the engaged portion of the frame. For example, by engaging the innermost mat, a selection region 706 may be generated providing a plurality of recommended mats or fillets. By engaging a respective mat or fillet in the selection region 706, the corresponding mat or fillet in the visualized mat and fillet region 703 may be updated dynamically, as well as the corresponding mat or fillet in the visualization region 506, utilizing AJAX or similar technology. The recommended mats or fillets within the selection region 706 may be generated, for example, utilizing at least the most relevant and/or most dominant colors identified in the digital image provided by or otherwise selected by the user, as will be discussed below with respect to FIGS. 22A-B.

A search field 709 provides the user the ability to search for particular items, such as frames, mouldings, matboards, glazings, fillets, liners, etc. utilizing, all with immediate visibility and configuration, for example, an item name or item number. An item details region 712 is configured to provide information about a selected item 715 in the selection region 706. For example, a user may engage a particular item in the selection region 706 utilizing, for example, a cursor 718. The item details region 712 may dynamically update to provide the user information about the selected item 715. In addition, a dialog 721 may be generated to provide the user with a name, color, and/or item number corresponding to the selected item 715.

A status component 724 of the user interface 272 may be configured to provide the user the ability to save or print the current framing process, as may be appreciated. In addition, the status component 724 may be configured to provide the user the ability to proceed to a checkout process that may facilitate the purchase of the customized frame as shown in the visualization region 506. A navigation region 727 may facilitate user-controlled navigation between respective phases in the customization process. For example, by engaging a respective portion of the navigation region 727, the user may be redirected to a user interface 272 corresponding to the engaged portion, such as the user interface 272 of FIGS. 7A-B configured to facilitate the selection of a mat.

Figure 7B:
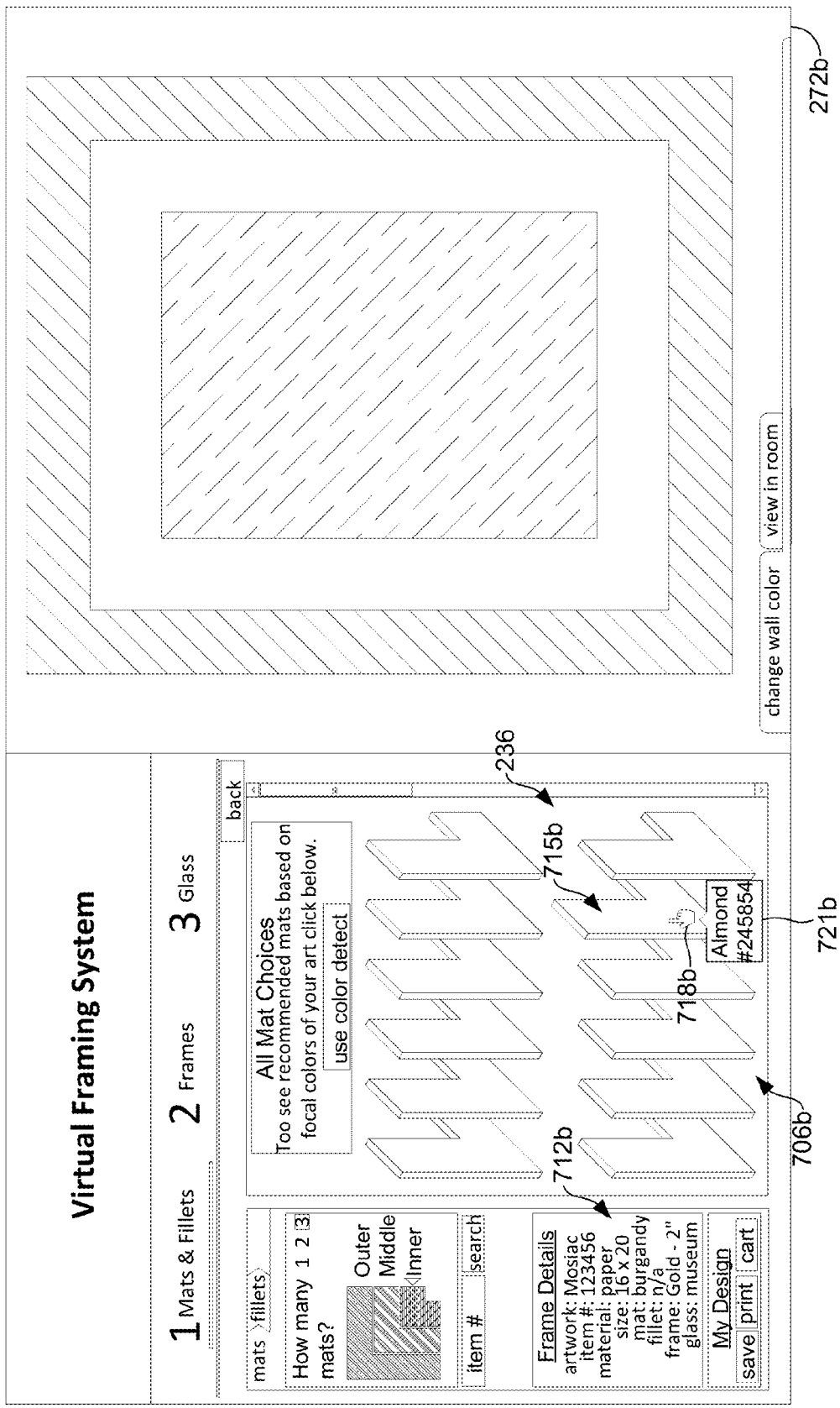

Referring next to FIG. 7B, shown is a pictorial diagram of another example user interface 272*b* rendered by a client device 206 (FIG. 2) in the networked environment 200 of FIG. 2 according to various embodiments of the present disclosure. The non-limiting example of FIG. 14B depicts an alternative item engaged in the selection region 706*b*. For example, a user may engage a particular item in the selection region 706*b* utilizing, for example, a cursor 718, whereas the selected mat material flows upward into a highlights view in position with the selected region. The item details region 712*b* may dynamically update to provide the user information about the selected item 715*b*. Also discussed above with respect to FIG. 14A, a dialog 721*b* may be generated to provide the user with a name, color, and/or item number corresponding to the selected item 715*b*.

Figure 8:
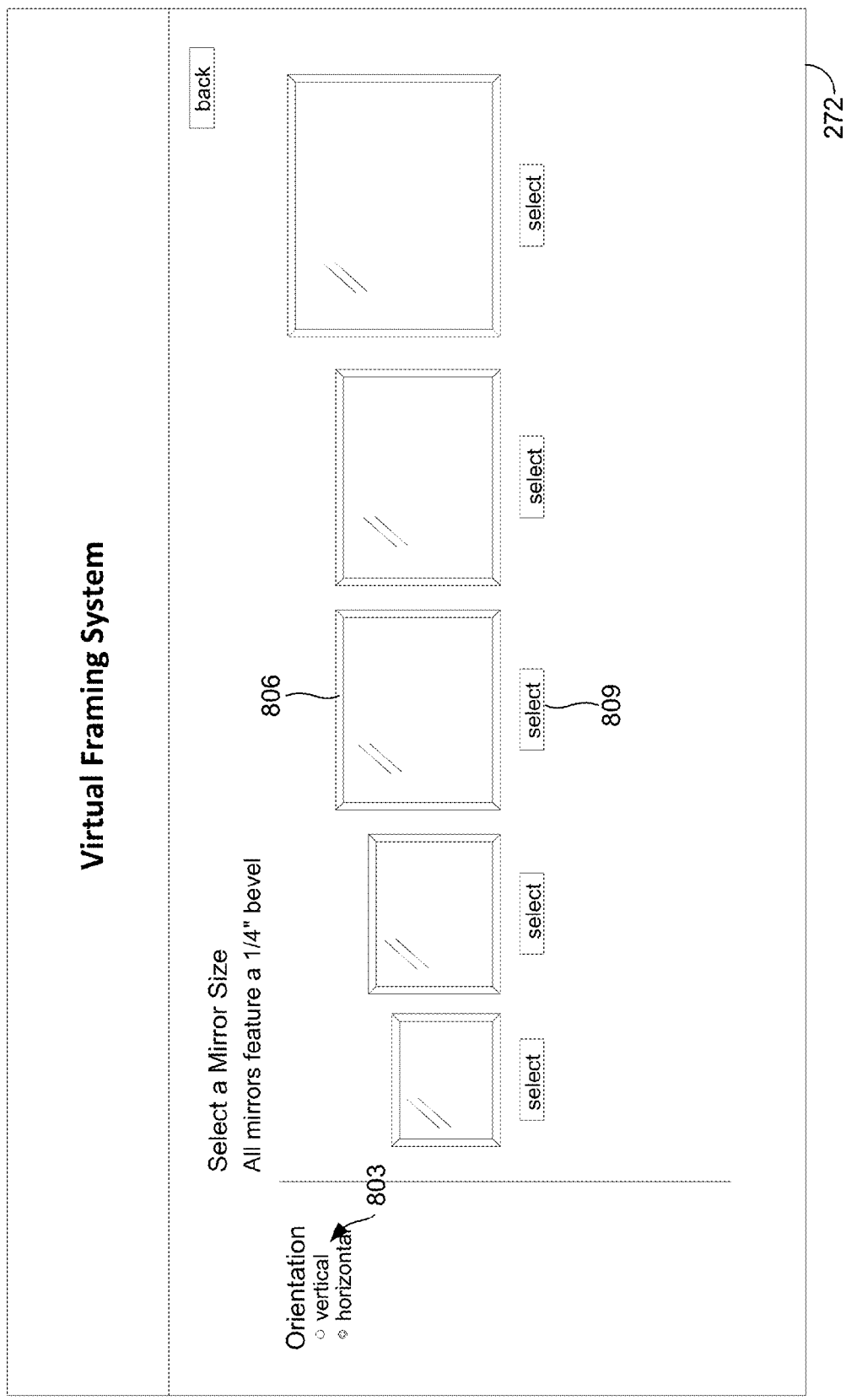

Moving on to FIG. 8, shown is a pictorial diagram of an example user interface 272 rendered by a client device 206 (FIG. 2) in the networked environment 200 of FIG. 2 according to various embodiments of the present disclosure. In the non-limiting example of FIG. 8, shown is a user interface 272 configured to facilitate a selection of a mirror in the event the user desires to frame a particular mirror. FIG. 8 may be generated, for example, responsive to a selection of the component 409 of FIG. 4. An orientation field 803 is configured to facilitate a selection of a vertical or a horizontal mirror. One or more sizes of mirrors 806 may be generated responsive to the selection of the vertical or horizontal orientation via the orientation field 803. By engaging a selection component 809, one or more additional user interfaces 272 may be rendered facilitating the customization of a frame comprising a corresponding mirror 806.

Figure 9:
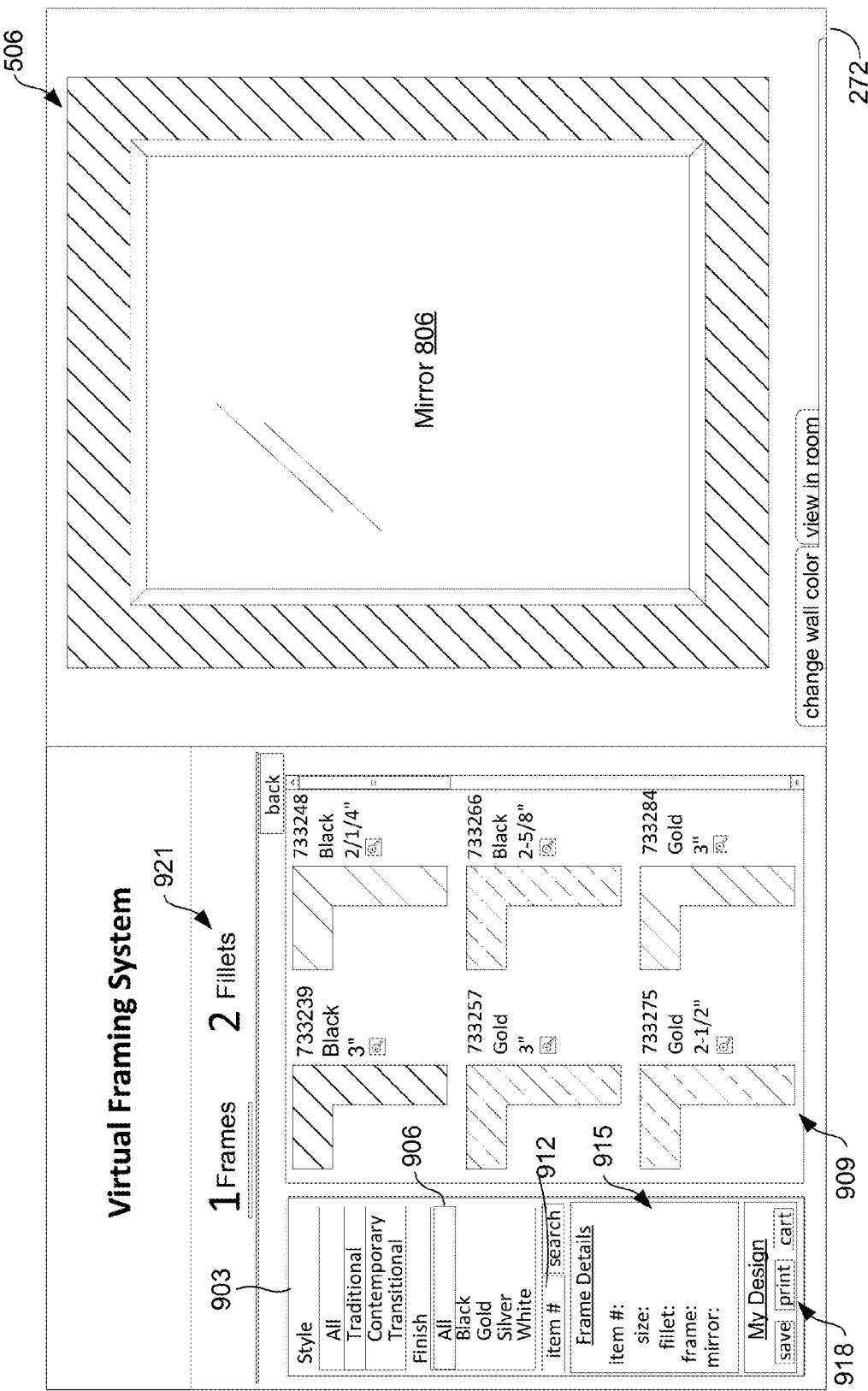

Turning now to FIG. 9, shown is a pictorial diagram of an example user interface 272 rendered by a client device 206 (FIG. 2) in the networked environment 200 of FIG. 2 according to various embodiments of the present disclosure. In the non-limiting example of FIG. 9, the user interface 272 may be configured to customize a selection of a frame, if desired by the user during a customization process. A style list 903 and a finish list 906 may facilitate the navigation between respective styles and finishes of frames during the customization process conducted by a user. For example, by engaging a style or a finish via the style list 903 and/or the finish list 906, a selection region 909 may be generated providing a plurality of recommended frames. By engaging a respective frame in the selection region 909, the corresponding frame may be generated in the visualization region 506, utilizing AJAX or similar technology. The recommended frames within the selection region 909 may be generated, for example, utilizing at least most-purchased frames associated with mirrors or based on user preferences.

A search field 912 provides the user the ability to search for particular items, such as frames, mouldings, matboards, glazings, fillets, liners, etc. utilizing, for example, an item name or item number. An item details region 915 is configured to provide information about a selected item, such as a frame, in the selection region 909. A status component 918 of the user interface 272 may be configured to provide the user the ability to save or print the current framing process, as may be appreciated. In addition, the status component 918 may be configured to provide the user the ability to proceed to a checkout process that may facilitate the purchase of the customized frame as shown in the visualization region 506. A navigation region 921 may facilitate user-controlled navigation between respective phases in the customization process. For example, by engaging a respective portion of the navigation region 921, the user may be redirected to a user interface 272 corresponding to the engaged portion, such as the user interface 272 of FIG. 9 configured to facilitate the selection of a frame for a mirror 806.

Referring next to FIG. 10, shown is a pictorial diagram of an example user interface 272 rendered by a client device 206 (FIG. 2) in the networked environment 200 of FIG. 2 according to various embodiments of the present disclosure. In the non-limiting example of FIG. 10, shown is a user interface 272 configured to facilitate a selection of artwork in the event the user desires to select artwork from a predefined list made available by the virtual framing system 215. FIG. 10 may be generated, for example, responsive to a selection of a category in FIG. 11. A style field 1003, a color field 1006, and a size field 1009 is configured to dial down a listing of applicable artwork. A selection area 1012 may be generated and/or updated responsive to the selection of a particular style, color, size. By engaging a piece of artwork in the selection area 1012, one or more additional user interfaces 272 may be rendered facilitating the customization of a frame comprising the corresponding piece of artwork selected.

Figure 11:
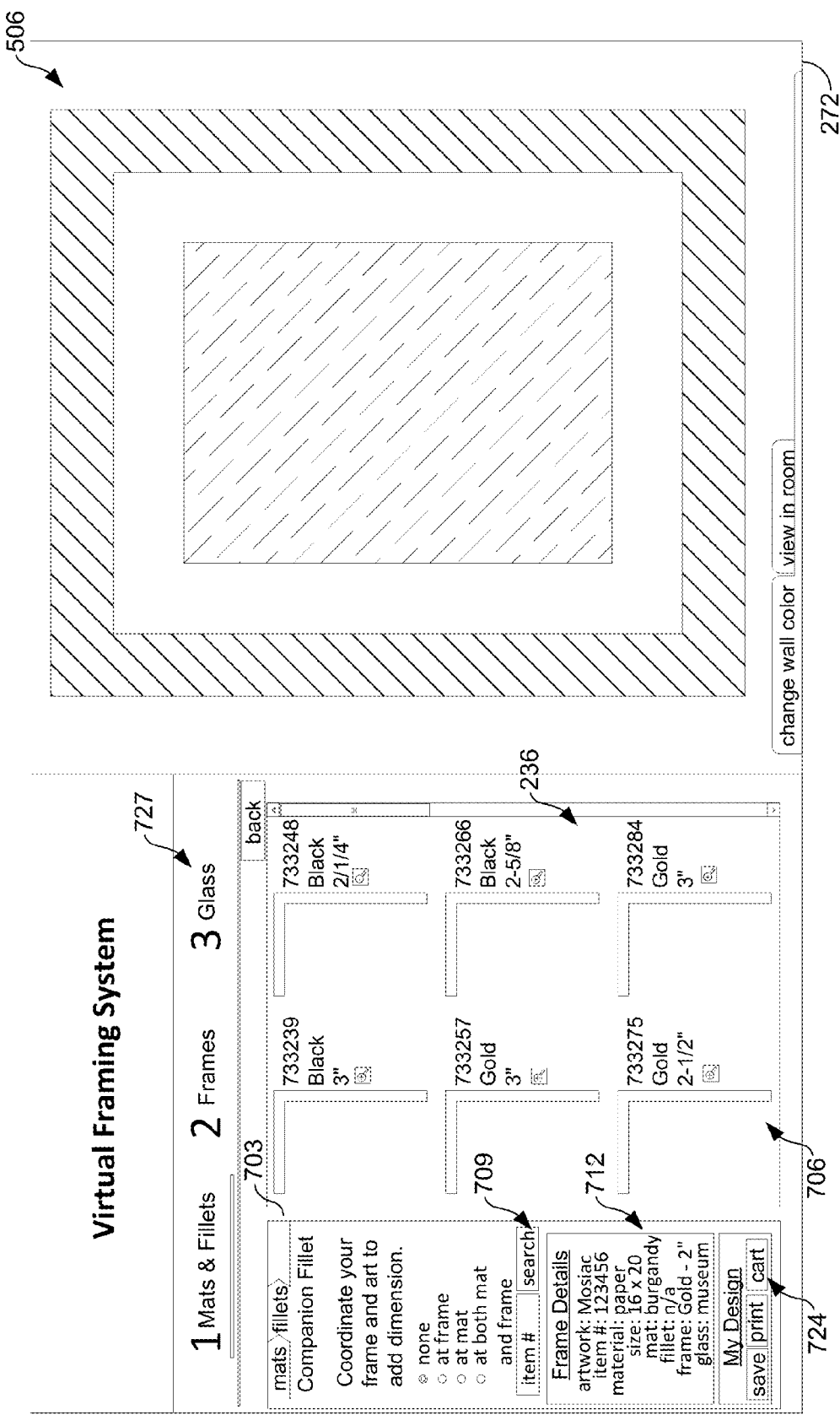

Turning now to FIG. 11, shown is a pictorial diagram of an example user interface 272 rendered by a client device 206 (FIG. 2) in the networked environment 200 of FIG. 2 according to various embodiments of the present disclosure. In the non-limiting example of FIG. 11, the user interface 272 may be configured to customize a selection of a fillet, if desired by the user during a customization process. A companion fillet region 703 may facilitate the navigation between respective fillets during the customization process of a user. For example, the user may choose between no fillet, a fillet at the frame, a fillet at the mat, or a fillet at both the mat and the frame. Accordingly, the visualized mat and fillet region 703 may facilitate a selection of a respective fillet for a frame. According to various embodiments, the selection of the respective fillet for the frame would be automated to rank and present the expert design recommendations based on art style, design, and meta data 255 previously gathered as discussed above.

A selection region 706 may be generated providing a plurality of recommended fillets. By engaging a respective fillet in the selection region 706, the corresponding fillet in the companion fillet region 703 may be updated dynamically, as well as the corresponding mat or fillet in the visualization region 506, utilizing AJAX or similar technology. The recommended fillets within the selection region 706 may be generated, for example, utilizing at least the most relevant and/or most dominant colors identified in the digital image provided by or otherwise selected by the user, as will be discussed below with respect to FIGS. 22A-B.

A search field 709 provides the user the ability to search for particular items, such as frames, mouldings, matboards, glazings, fillets, liners, etc. utilizing, for example, an item name or item number. An item details region 712 is configured to provide information about a selected item (not shown) in the selection region 706. The item details region 712 may dynamically update upon a selection to provide the user information about the selected item 715.

A status component 724 of the user interface 272 may be configured to provide the user the ability to save or print the current framing process, as may be appreciated. In addition, the status component 724 may be configured to provide the user the ability to proceed to a checkout process that may facilitate the purchase of the customized frame as shown in the visualization region 506. A navigation region 727 may assist with user-controlled navigation between respective phases in the customization process. For example, by engaging a respective portion of the navigation region 727, the user may be redirected to a user interface 272 corresponding to the engaged portion, such as the user interface 272 of FIG. 11 configured to facilitate the selection of one or more fillets.

Figure 12:
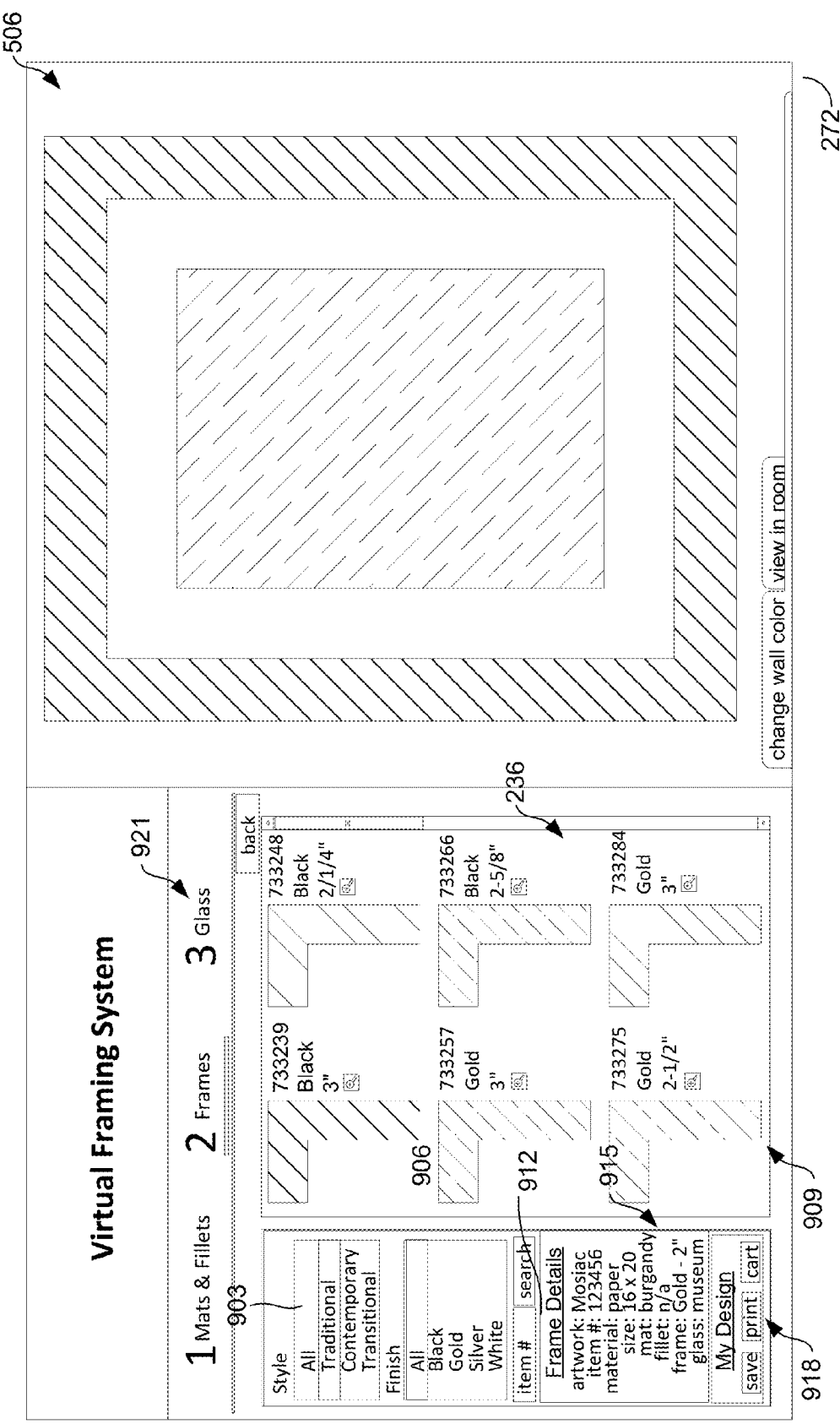

Moving on to FIG. 12, shown is a pictorial diagram of an example user interface 272 rendered by a client device 206 (FIG. 2) in the networked environment 200 of FIG. 2 according to various embodiments of the present disclosure. In the non-limiting example of FIG. 12, the user interface 272 may be configured to customize a selection of a frame, if desired by the user during a customization process. A style list 903 and a finish list 906 may facilitate the navigation between respective styles and finishes of frames during the customization process conducted by a user. For example, by engaging a style or a finish via the style list 903 and/or the finish list 906, a selection region 909 may be generated providing a plurality of recommended frames. By engaging a respective frame in the selection region 909, the corresponding frame may be generated in the visualization region 506, utilizing AJAX or similar technology. The recommended frames within the selection region 706 may be generated, for example, utilizing at least most-purchased frames associated with mirrors or based on user preferences.

Figure 13:
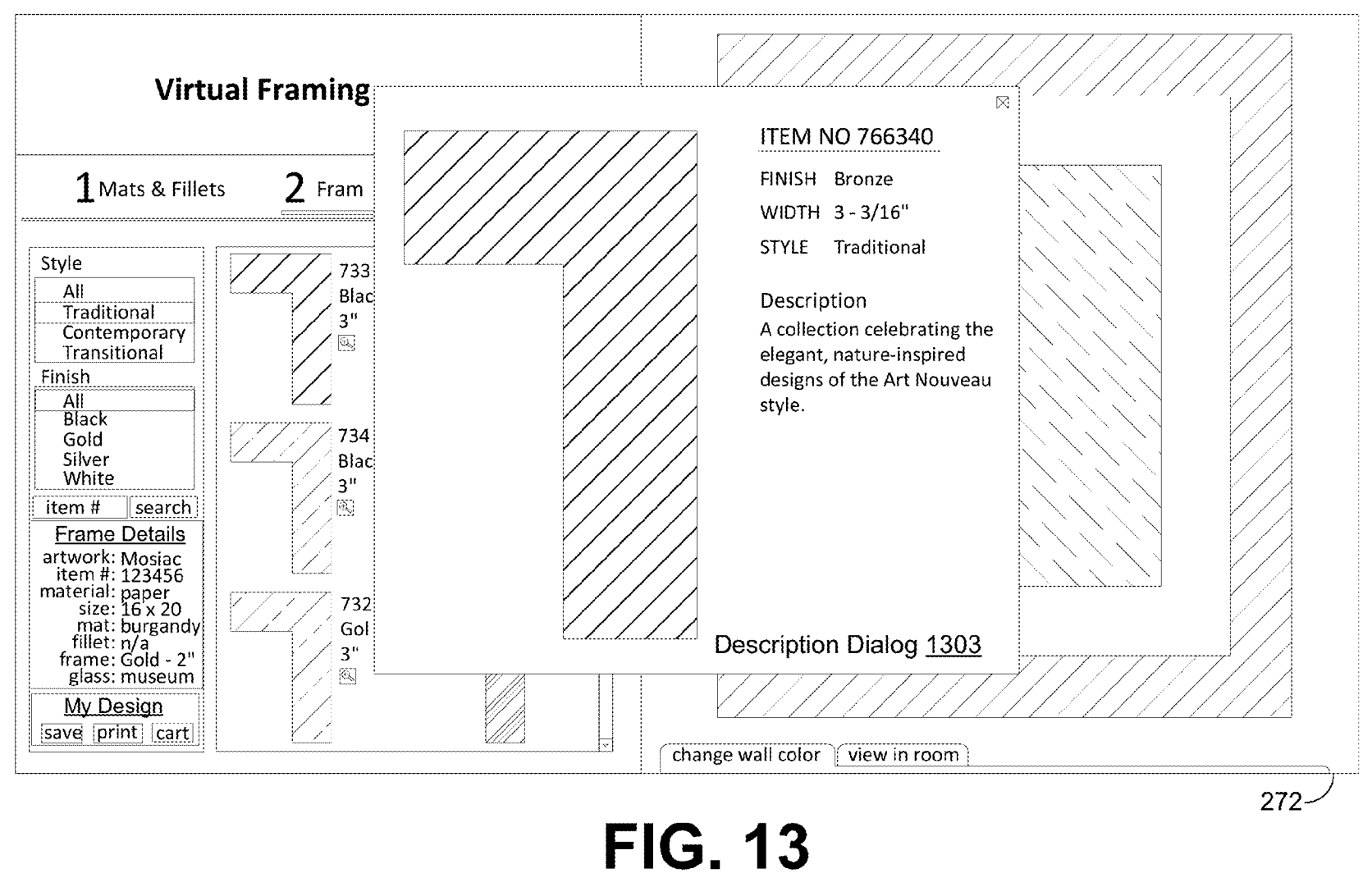

Referring next to FIG. 13, shown is a pictorial diagram of an example user interface 272 rendered by a client device 206 (FIG. 2) in the networked environment 200 of FIG. 2 according to various embodiments of the present disclosure. In the non-limiting example of FIG. 13, the user interface 272 may be configured to customize a selection of a frame, if desired by the user during a customization process. According to various embodiments, by engaging a respective frame in the selection region 909, a corresponding description dialog 1303 may be rendered providing more information associated with the frame engaged in the selection region 909. In the non-limiting example of FIG. 13, information about a frame that may be presented in the description dialog 1703 may comprise, for example, an item number corresponding to the frame, a finish, a width, a style, a description, and/or any other information associated with the frame engaged by the user.

Figure 14:
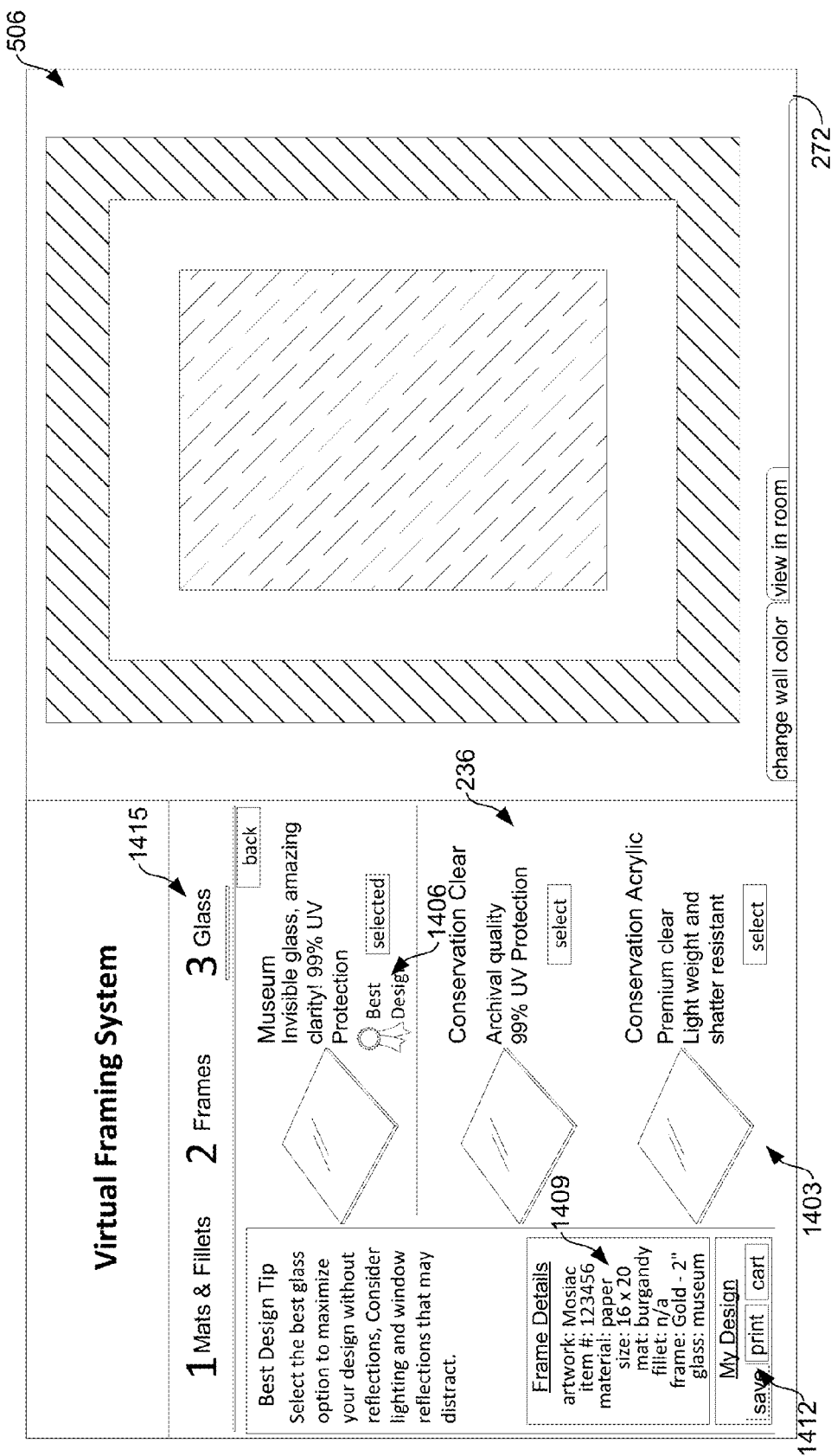

Turning now to FIG. 14, shown is a pictorial diagram of an example user interface 272 rendered by a client device 206 (FIG. 2) in the networked environment 200 of FIG. 2 according to various embodiments of the present disclosure. In the non-limiting example of FIG. 14, the user interface 272 may be configured to customize a selection of glass or glazing (e.g., acrylic glazing), that may be employed in a construction of the frame, if desired by the user during a customization process. By engaging a respective type of glass or glazing in a selection region 1403, the corresponding type of glass or glazing may be generated in the visualization region 506, utilizing AJAX or similar technology. The recommended types of glass or glazing within the selection region 1403 may be generated, for example, utilizing at least most-purchased types of frames associated with mirrors, best design choices, or based on user preferences. For example, in the event a type of glass or glazing corresponds to a best design choice (according to best designs stored in the data store 212), a badge 1406 may be placed in association with the type of glass to recommend a particular type of glass to the user.

A frame details region 1409 is configured to provide information about the features selected for the frame during the customization process. The information provided in the frame details region 1409 may include, for example features, such as the artwork selected or provided by the user, a unique order number, a material of the artwork, a size of the frame, a type of mat, a type of fillet, a type of frame, and a type of glass. A status component 1412 of the user interface 272 may be configured to provide the user the ability to save or print the current framing process, as may be appreciated. In addition, the status component 1412 may be configured to provide the user the ability to proceed to a checkout process that may facilitate the purchase of the customized frame as shown in the visualization region 506.

A navigation region 1415 may facilitate user-controlled navigation between respective phases in the customization process. For example, by engaging a respective portion of the navigation region 1415, the user may be redirected to a user interface 272 corresponding to the engaged portion, such as the user interface 272 of FIG. 14 configured to facilitate the selection of a type of glass or glazing during the customization process.

Figure 15:
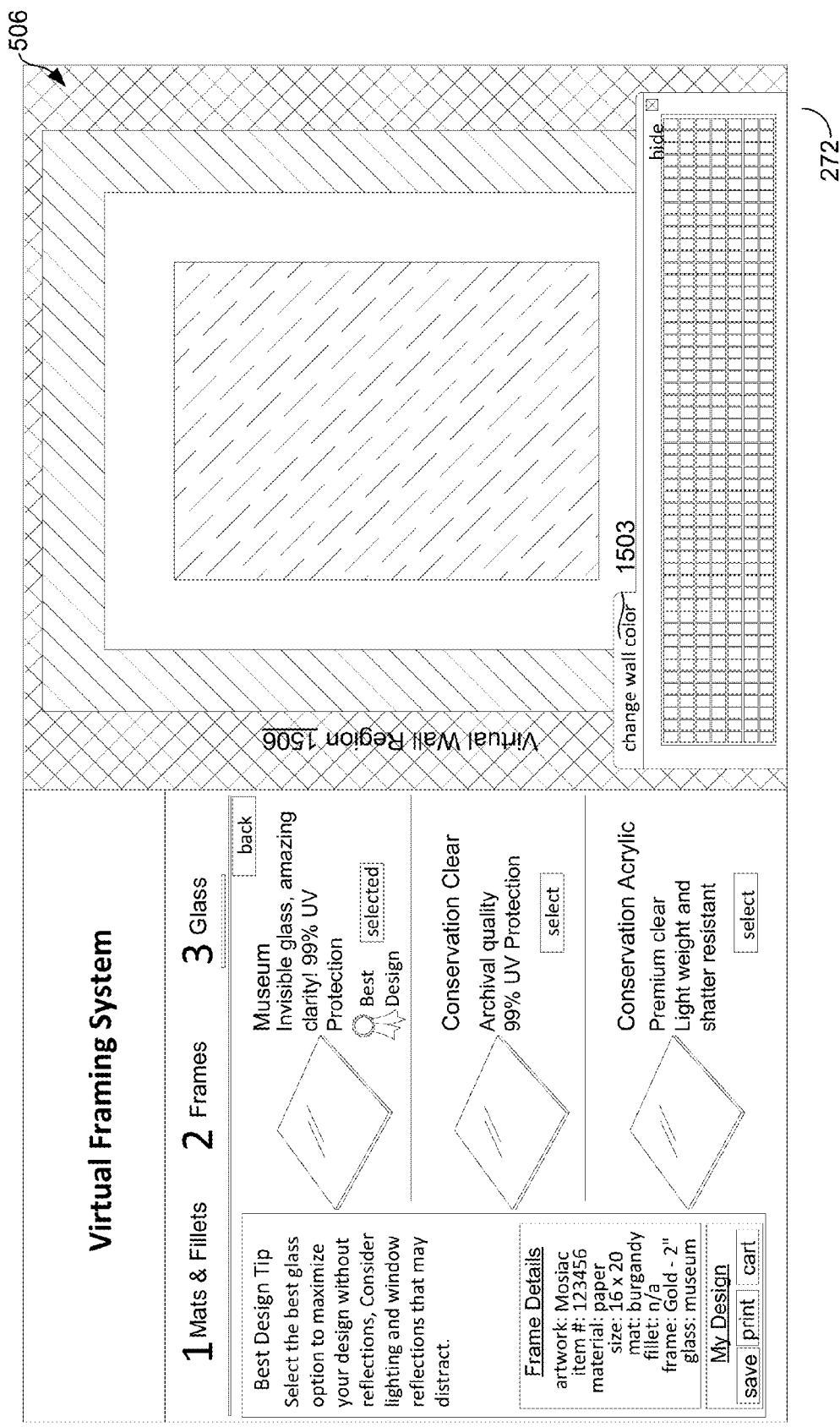

Moving on to FIG. 15, shown is a pictorial diagram of an example user interface 272 rendered by a client device 206 (FIG. 2) in the networked environment 200 of FIG. 2 according to various embodiments of the present disclosure. In the non-limiting example of FIG. 15, a change color component 1503 may be engaged by the user to change a color of a virtual wall region 1506 shown in the visualization region 506. For example, a user may desire to view a customized frame or frames on a wall color similar to the wall within a home of the user. Accordingly, the change color component 1503 provides the ability to view the visualization region 506 with respect to the color of the wall within the home or office of the user. As shown in the non-limiting example of FIG. 15, the virtual wall region 1506 is shown as a color provided by the user via the change color component 1503.

Figure 16:
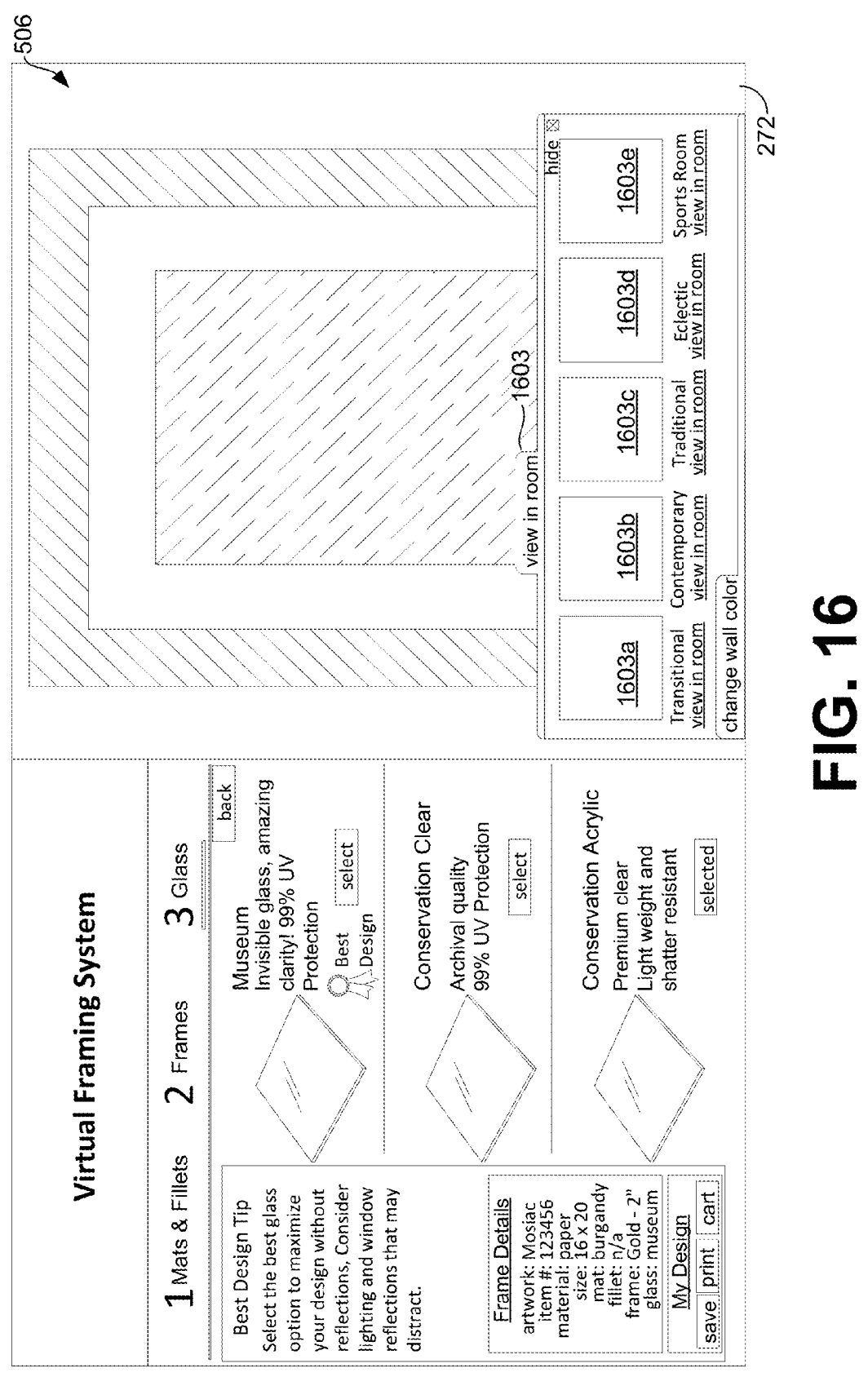

Turning now to FIG. 16, shown is a pictorial diagram of an example user interface 272 rendered by a client device 206 (FIG. 2) in the networked environment 200 of FIG. 2 according to various embodiments of the present disclosure. In the non-limiting example of FIG. 16, a view in room component 1603 may be engaged by the user to view the frame depicted in the visualization region 506 in a virtual room. For example, a user may desire to view a customized frame or frames on a wall of a room similar to a wall within a home of the user. Accordingly, the view in room component 1603 provides the ability to view the visualization region 506 with respect to a wall within a room in, for example, the home or office of the user. According to various embodiments, the region of the user interface is further configured to provide a three-dimensional interaction with the virtual room when engaged by the user. For example, the user may use a mouse or hand gestures on a touch screen display to circumnavigate the virtual room in its corresponding region of the user interface. The three-dimensional interaction may be generated utilizing known three-dimensional reconstruction techniques (e.g., stereo vision, camera models, etc.) from a plurality of images either provided by the user during the customization process or provided by the virtual framing system 215.

The view in room component 1603 may comprise, for example, a plurality of types of rooms 1606a, 1606b, 1606c, 1606d, and 1606e in which a customized frame may be rendered. Types of rooms may comprise, for example, a transitional room, a contemporary room, a traditional room, an eclectic room, a sports room, etc. When engaged by the user, a dialog or one or more additional user interfaces 272 may be rendered to generate the customized frame within a type of room corresponding to the engaged type of room, as will be discussed below with respect to FIG. 17.

Figure 17:
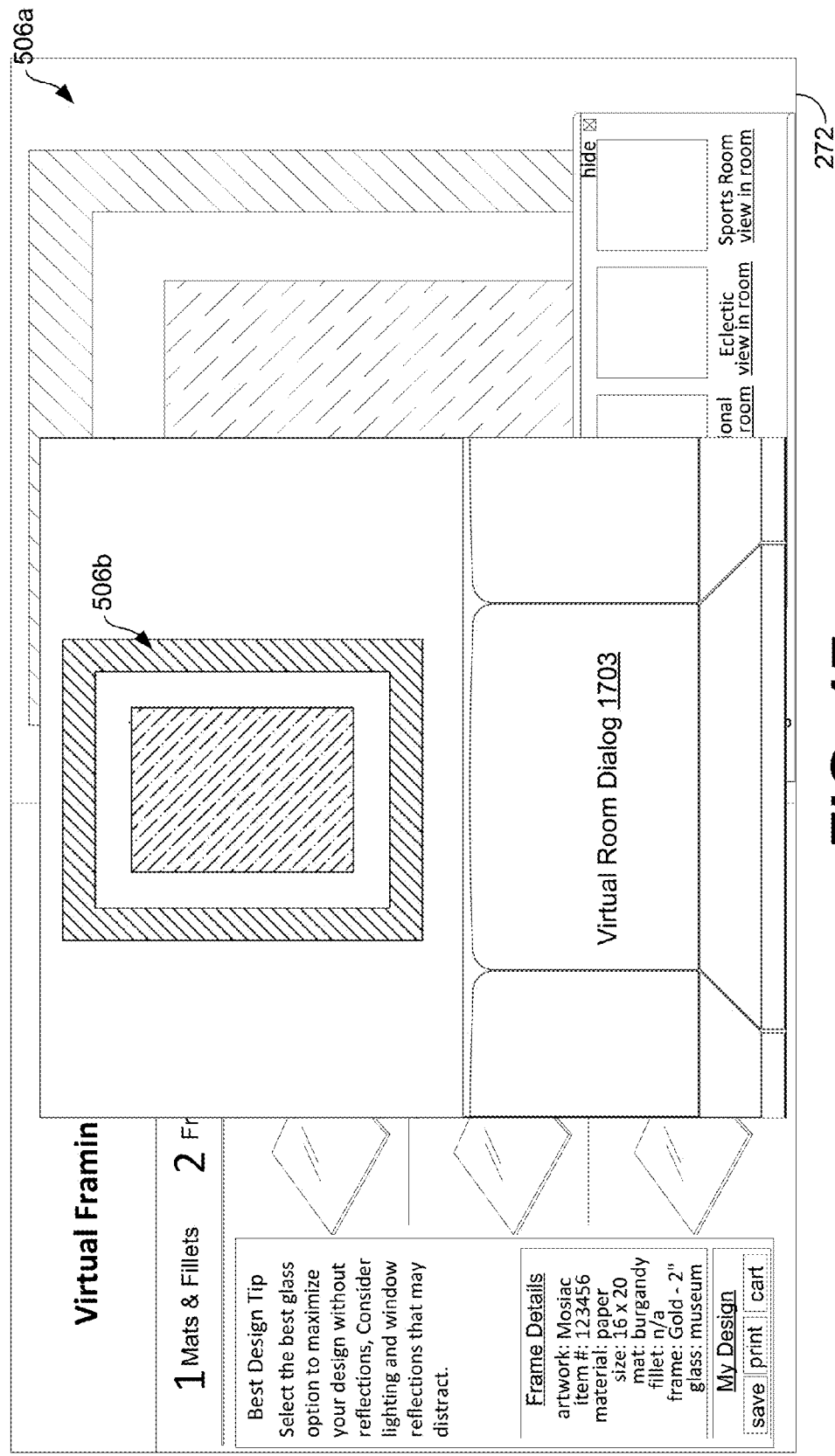

Moving on to FIG. 17, shown is a pictorial diagram of an example user interface 272 rendered by a client device 206 (FIG. 2) in the networked environment 200 of FIG. 2 according to various embodiments of the present disclosure. In the non-limiting example of FIG. 22, the user interface 272 may comprise, for example, a virtual room dialog 1703 comprising the customized frame generated in the first visualization region 506a of the user interface 272. The type of room generated in the virtual room dialog 1703 may be generated in response to a selection of a type of room made by the user, for example, via the user interface 272 of FIG. 16. As shown in in the virtual room dialog, a second visualization region 506b may be rendered with respect to scale of a virtual room. In addition, a wall color shown in the virtual room dialog 1703 may be the same as a wall color provided by the user, for example, via the change color component 1503 described with respect to FIGS. 19-20.

According to various embodiments, electronic framing system 215 may facilitate an upload of a picture of a room provided by the user. Accordingly, the frame customized by the user may be generated within the room with an appropriate aspect ratio and at a proper angle aligned with the wall. This may be accomplished by employing known computer vision algorithms employed to determine three-dimensional information from a two-dimensional image, such as those that determine sizes and angles of walls.

Figure 18:
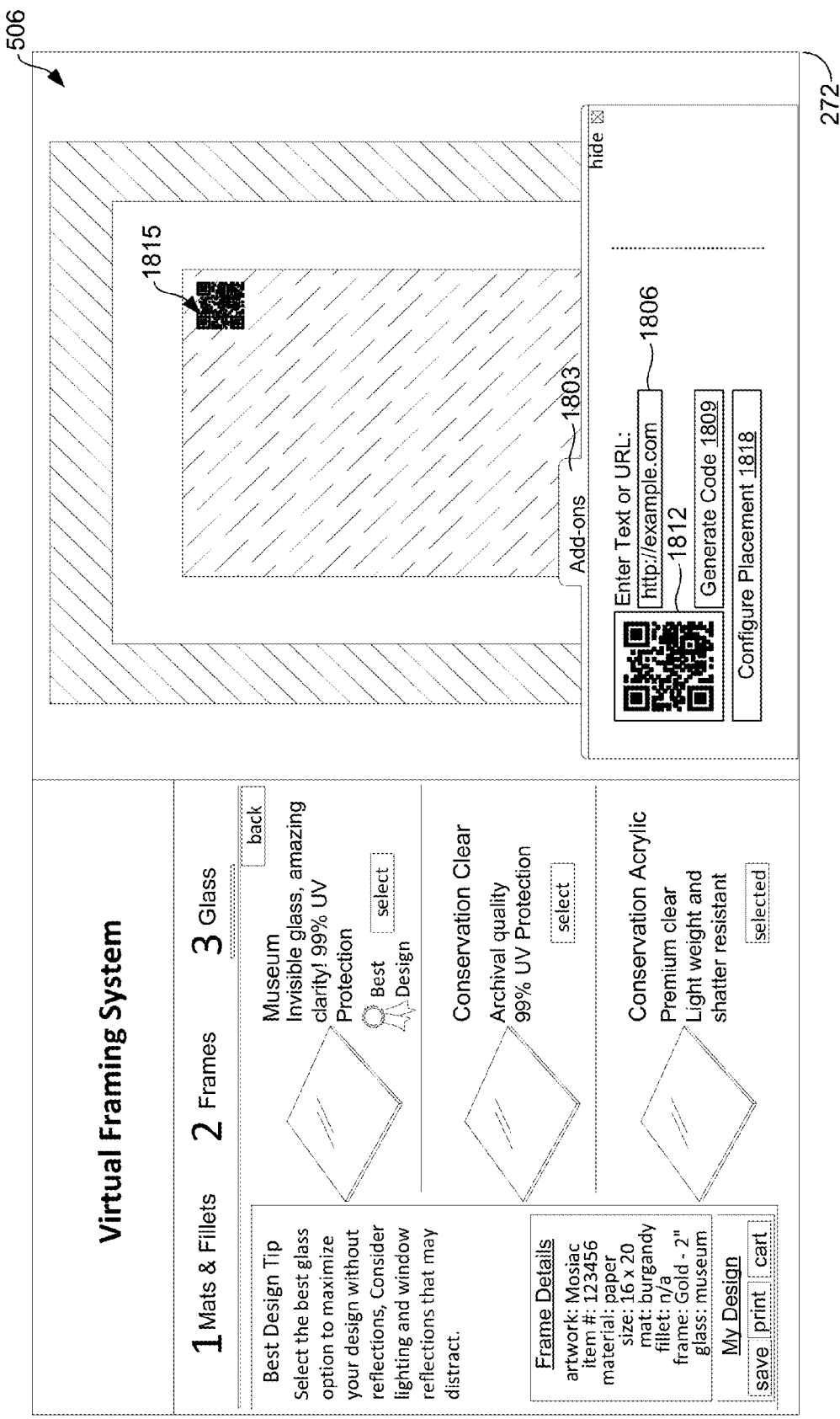

Referring next to FIG. 18, shown is a pictorial diagram of an example user interface 272 rendered by a client device 206 (FIG. 2) in the networked environment 200 of FIG. 2 according to various embodiments of the present disclosure. In the non-limiting example of FIG. 18, a personal archive add-on component 1803 is configured to provide the user with the ability to further customize a frame. In certain situations, it may be beneficial to the user to place a machine-readable visual identifier, such as a bar code or a quick response (QR) code, etc., in a particular position of the glazing within the custom frame and/or frames. As may be appreciated, when the visual identifier is detected using a visual identifier reading device (e.g., barcode scanner, QR code scanner), a message may be displayed, a predefined action may be initiated, a hyperlink may be accessed, etc. Accordingly, the add-on component may be configured to generate a visual identifier for placement on the custom frame design by etching the visual identifier on the glass, on the frame, on the matboard, or by placing a label or decal on a particular portion of the custom frame design as defined by the user.

Utilizing a text field 1806, a user may enter text to be displayed or a URL to be accessed in response to a reading of the visual identifier utilizing a visual identifier reading device. A generate code component 1809 may be engaged to initiate a rendering of the visual identifier in a preview region 1812 within the add-on component and/or the visualization region 506 as depicted by the visual identifier 1815 within the customized frame. According to various embodiments, the generated visual identifier may encode a link to a web service operated or in communication with the virtual framing system 215. The web service may be configured to display the predefined text, play a personalized audio recording, or initiate the predefined action, as set forth by the user during the customization process. The placement of the visual identifier 1815 on a respective frame may be facilitated using a configure placement component 1818 that may initiate one or more user interfaces 272 to facilitates a selection and placement of the visual identifier 1815 on a respective portion of the customized frame.

Figure 19:
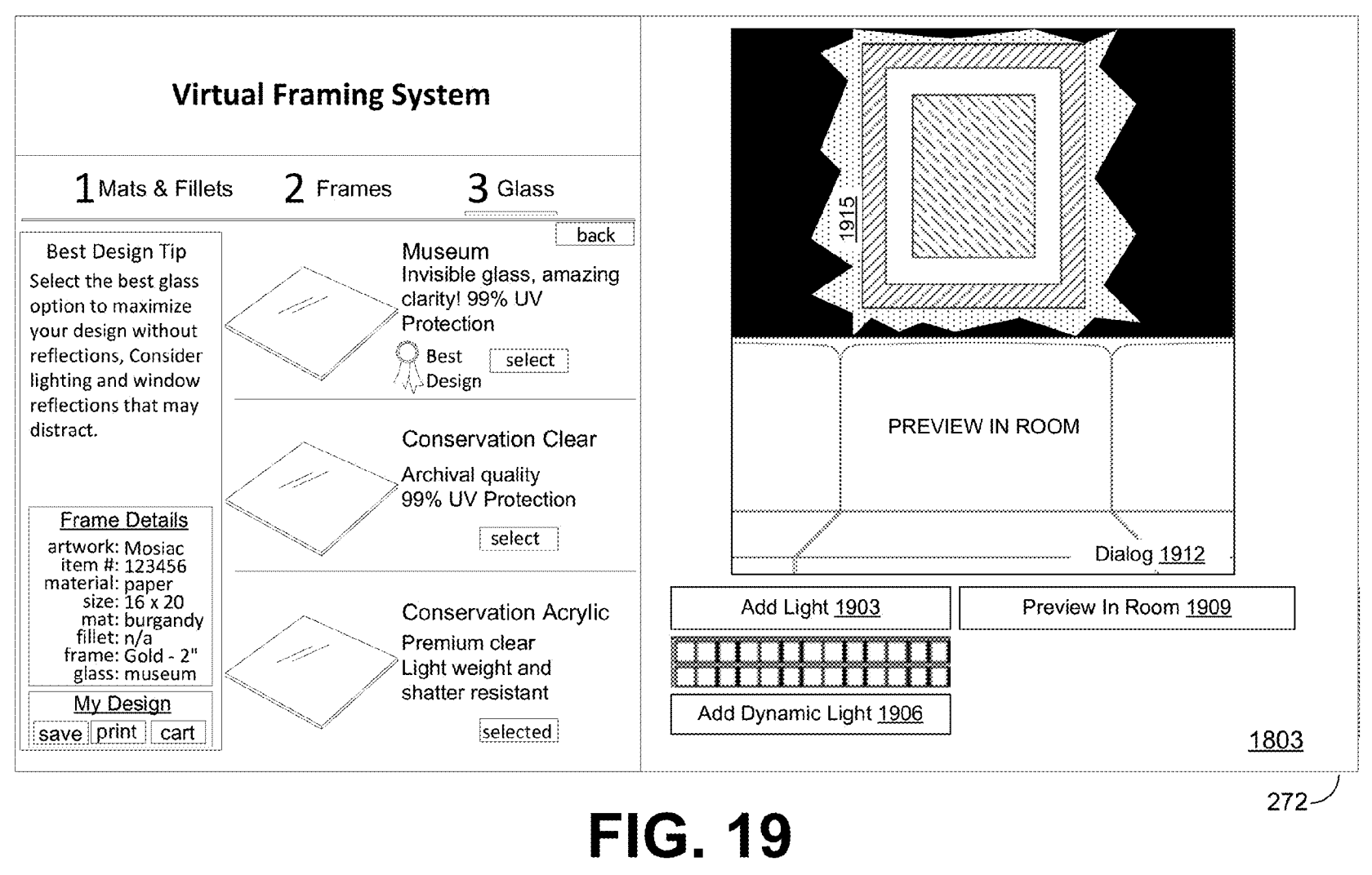

Turning now to FIG. 19, shown is a pictorial diagram of an example user interface 272 rendered by a client device 206 (FIG. 2) in the networked environment 200 of FIG. 2 according to various embodiments of the present disclosure. In the non-limiting example of FIG. 19, an add-on component 1803 provides the user with the ability to further customize a frame. In certain situations, it may be beneficial to the user to place a lighting device, such as a light emitting diode (LED)-based device, etc., in a particular position of the frame such as the back side of the frame. Various LED-based devices may be configured to display a particular color of light. Other LED-based devices may be configured to dynamically change the color of light. As may be appreciated, when on display the light emitted from the back side of the frame may illuminate portions of the wall on which the frame is placed.

According to various embodiments, a lighting device, such as an LED-based device, may communicate with a client device 206 via Bluetooth®, wireless fidelity (WiFi), ZigBee®, Infared, Near Field Communication (NFC), and/or any other communication technology to sync a color of the light to a specified color defined in the client device 206 using, for example, a client application 269 (FIG. 2). In various embodiments, a color of a multi-color LED device located, for example, on the back side of a frame may be controlled by a web service, wherein one or more users may specify a particular color to the web service that may initiate a change of the color of the LED device. As a non-limiting example, a mobile application running on a first mobile device may interface with the web service, wherein a user of the mobile first mobile device may communicate a particular color to the web service via the mobile application, for example, based on an emotion the user is feeling or for a variety of other reasons. For example, a person having somber emotions may select a blue color which, in effect, may communicate his or her emotion to be displayed via the LED device. A second mobile device (e.g., a local device) may download instructions from the web service to change the color of the LED device, for example, when the second mobile device is within a communication range of the LED device located on or near a custom frame. The second mobile device may initiate a changing of the LED device via (WiFi), ZigBee®, Infared, Near Field Communication (NFC), and/or any other communication technology, when the second mobile device is within a communication range of the LED device on the custom frame. As may be appreciated, when a user selects various features of the LED device via the user interface, the selections provided by the user may be used in the generation of a purchase order document so that a customized frame may have the features customized via the user interface 272.

Accordingly, the add-on component may be configured to provide the user with the ability to customize settings of a LED-based device by either defining a custom color utilizing the additional light component 1903 or by adding a dynamic light color utilizing the add dynamic light component 1906. When a user engaged a preview in room component 1909, a dialog 1912 may be rendered providing a preview of the customized frame within a particular room. An illuminated region 1915 shown within the dialog 1912 may correspond to either a light color predefined by the user or may dynamically change if a user has indicated the use of a dynamic light device.

Figure 20:
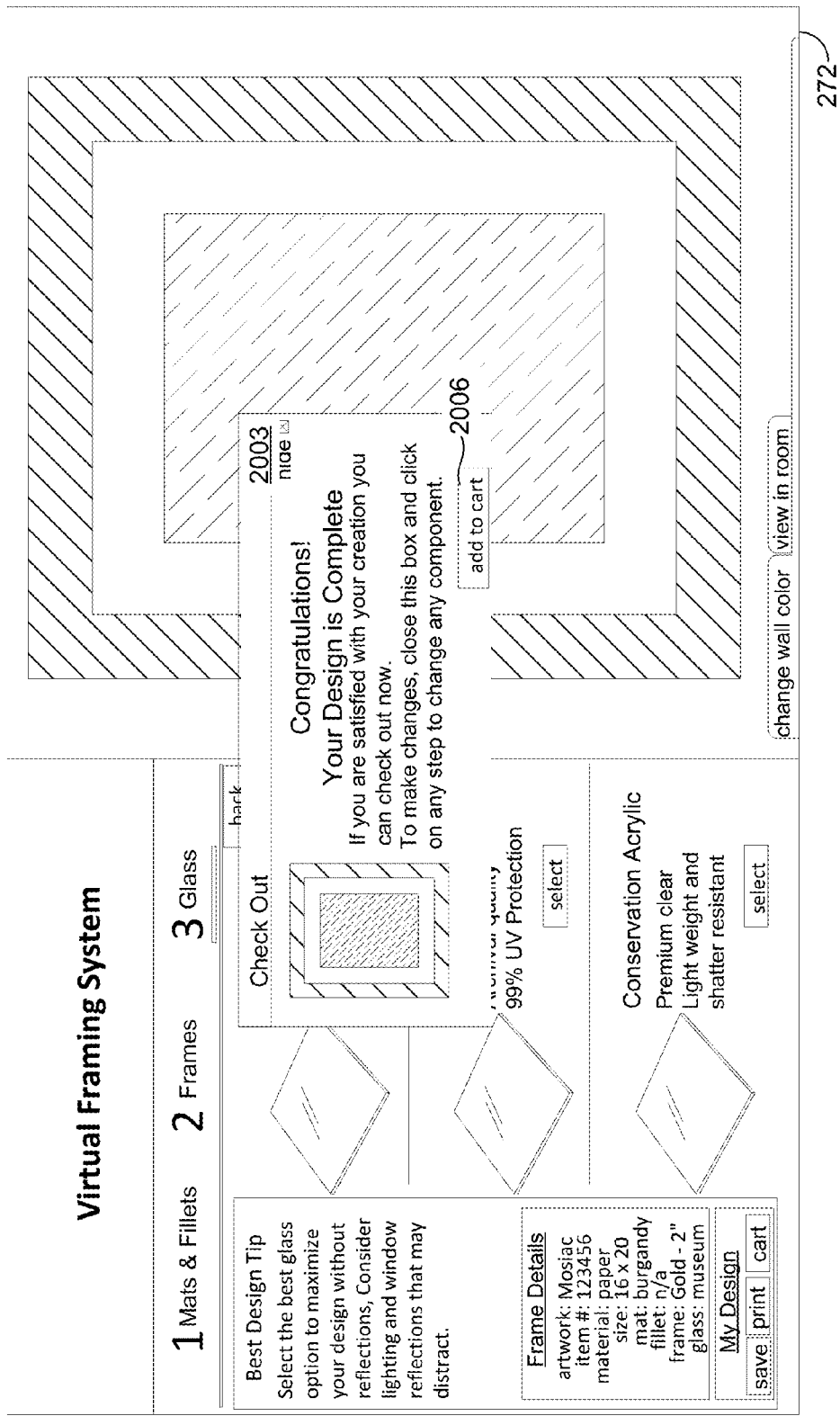

Moving on to FIG. 20, shown is a pictorial diagram of an example user interface 272 rendered by a client device 206 (FIG. 2) in the networked environment 200 of FIG. 2 according to various embodiments of the present disclosure. In the non-limiting example of FIG. 20, a check out dialog 2003 may be rendered notifying the user that all portions of the customization proceed have been complete. An add to cart component 2006 may initiate an addition of the customized frame created during the customization process to a virtual shopping chart and may proceed to a checkout process, as discussed below with respect to FIG. 24.

Figure 21A:
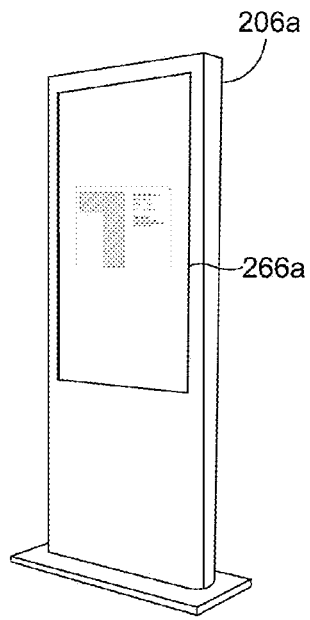
FIGS. 21A-B are drawings of exemplary client devices capable of rendering the user interfaces of FIGS. 3-20 in the networked environment of FIG. 2 according to various embodiments of the present disclosure.
Figure 21B:
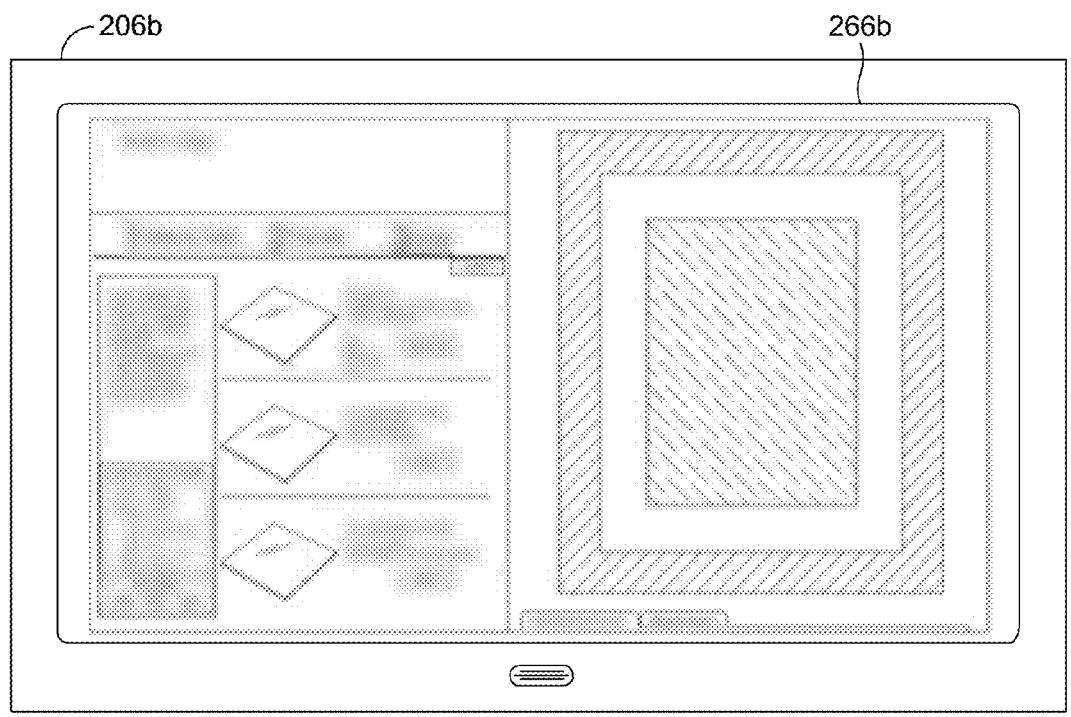

Moving on to FIGS. 21A-B, shown are drawings of exemplary client devices 206a and 206b capable of rendering the user interfaces 272 of FIGS. 3-20 in the networked environment of FIG. 2 according to various embodiments of the present disclosure. In the non-limiting example of FIG. 21A, a first client device 206a may comprise, for example, a kiosk computing device. In the non-limiting example of FIG. 21B, a second client device 206b may comprise, for example, a television. The first client device 206a and the second client device 206b may comprise, for example, a first display 266a and a second display 266b. The first display 266a and the second display 266b may further comprise, for example, a liquid crystal display (LCD), a gas plasma-based flat panel display, an organic light emitting diode (OLED) display, an electrophoretic ink (E ink) display, an LCD projector, a touch screen display, or other types of display devices, etc.

As discussed above with respect to FIG. 2, a client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, "smart" devices such as "Smart TVs," kiosk computing devices, or other devices with similar capability. The client device 206 may include a display 266.

Figure 22A:
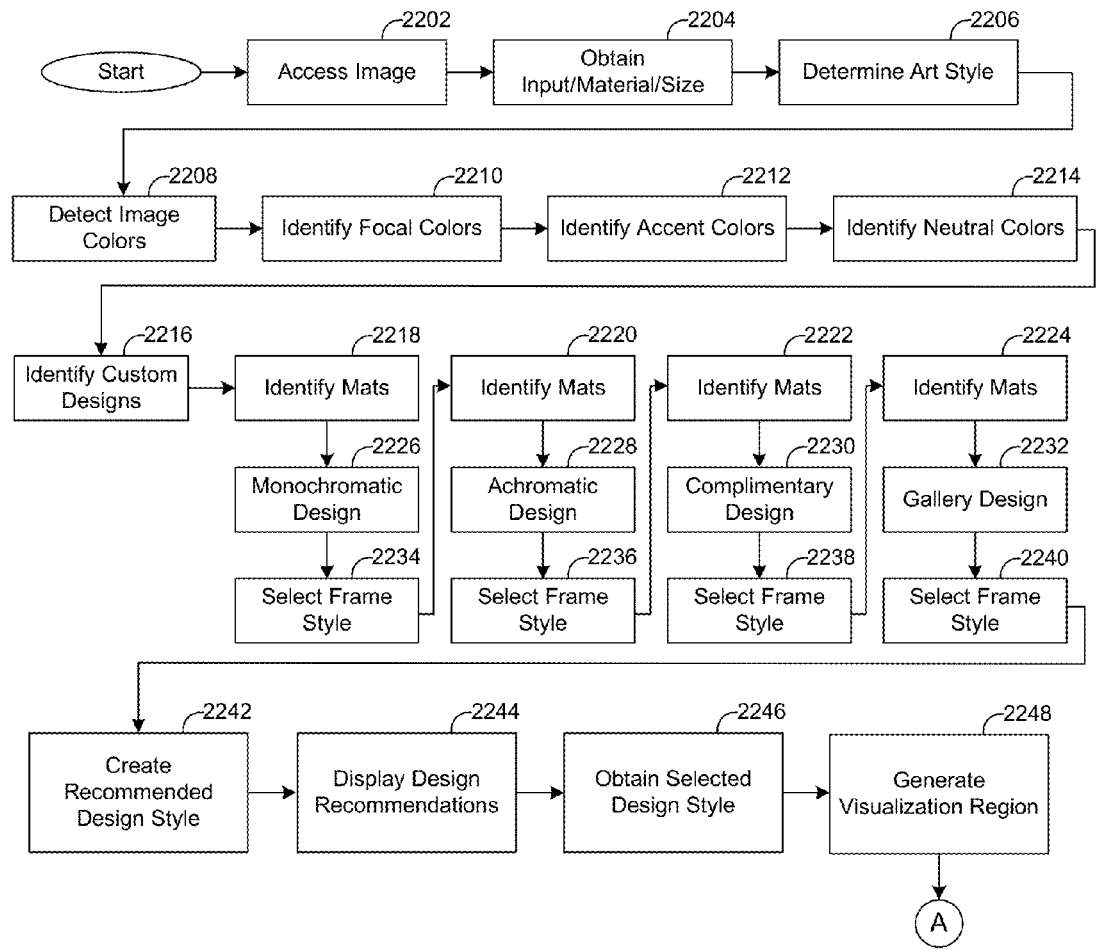
FIGS. 22-24 are flowcharts illustrating one or more examples of functionality implemented as portions of a virtual framing system executed in a computing environment in the networked environment of FIG. 2 according to various embodiments of the present disclosure.
Figure 22B:
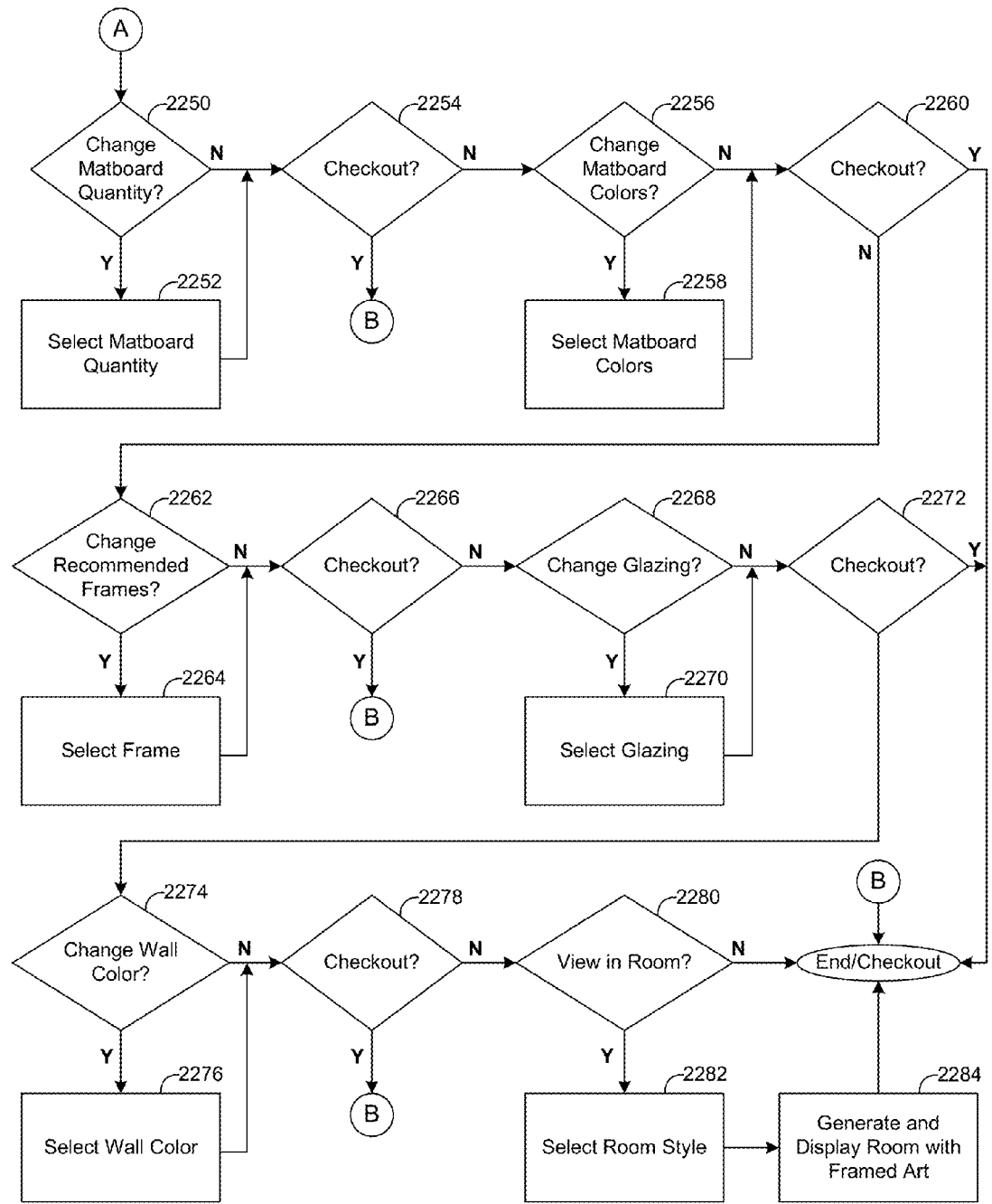

Referring next to FIGS. 22A-B, shown is a flowchart that provides one example of the operation of a portion of the virtual framing system 215 according to various embodiments. It is understood that the flowchart of FIGS. 22A-B provides merely an example of the many different types of functional arrangements that may be employed to implement the operation of the portion of the virtual framing system 215 as described herein. As an alternative, the flowchart of FIGS. 22A-B may be viewed as depicting an example of elements of a method implemented in the computing environment 203 (FIG. 2) according to one or more embodiments.

Beginning with 2202, the virtual framing system 215 may access a digital image provided by or otherwise selected by a user of the virtual framing system 215. According to one embodiment, the user may be provided with the ability to upload an image locally accessible by the client device 206. Upon a completion of the upload, the image provided by the user may be stored, for example, in the data store 212 for access by the virtual framing system 215. In various embodiments, the user may be provided with predefined digital images (e.g., artwork offered for purchase by the virtual framing system 215) which are stored in the data store 212 for selection by the user. The user may select one or more the predefined digital images. Accordingly, the virtual framing system 215 may access or otherwise obtain the digital image selected by or provided by the user.

In 2204, a plurality of preferences may be accessed in association with the digital image accessed in 2202. For example, the preferences may comprise a material or surface on which the digital image may be placed (e.g., canvas, linen, laminate). In one embodiment, a component of a user interface 272 (FIG. 2) may be generated prompting the user to provide the material or surface from, for example, a predefined list of materials. Similarly, the preferences may comprise a size of the surface or material on which the digital image may be placed (e.g., 16"×20", 18"×24", 36"×48"). In one embodiment, a component of a user interface 272 may be generated prompting the user to provide the size of the material or surface from, for example, a predefined list of sizes.

Moving on to 2206, one or more art styles may be accessed in association with the digital image accessed in 2202. For example, a style of art of the digital image may be beneficial in generating recommendations, such as expert design recommendations, for particular mouldings, matboards, glazings, fillets, liners, etc. that may be aesthetically pleasing in association with the digital image. According to various embodiments, a component of a user interface 272 may be generated prompting the user to provide the art style of the digital image from, for example, a predefined list of art styles. According to various embodiments, the art style may be determined from metadata extracted from the digital image and/or other characteristics of the digital image.

In 2208, the colors of the digital image may be automatically detected by the virtual framing system 215. For example, the colors of the digital image may be examined on a pixel-by-pixel basis to identify unique colors located within the digital image. The colors identified in the digital image may be ranked to identify which of the plurality of colors meet a predefined threshold indicating which colors are the most relevant or dominant colors in the digital image. By utilizing the most relevant or dominant colors of the digital image, the virtual framing system 215 may generate recommendations, such as expert design recommendations, to be presented to the user, as will be discussed in greater detail below. The most relevant or dominant colors may be categorized by a type of the colors. According to one embodiment, the type of colors may be categorized as focal, accent, and/or neutral (FAN) although it is understood that additional categorizations may be employed.

In 2210, the focal colors may be identified. Similarly, the accent colors and the neutral colors may be identified in 2212 and 2214, respectively. According to one embodiment, the focal colors, the accent colors, and the neutral colors may be identified, for example, by comparing the colors identified in the digital image to predefined expert templates of typical focal colors, accent colors, and neutral colors, wherein the predefined expert templates are stored in the data store 212 and accessible by the virtual framing system 215. The focal colors, the accent colors, and the neutral colors identified in the digital image may be ranked according to a respective category to identify which of the plurality of colors meet a predefined threshold indicating which colors are the most relevant or dominant colors in each category. For example, all or a portion of the focal colors may be ranked to identify the most relevant focal colors in the digital image.

In 2216, one or more custom designs may be identified according to the colors identified in, for example, 2208, 2210, 2212, and 2214. For example, based on the FAN colors 233 (FIG. 2) identified in the digital image, a plurality of model designs predefined in the data store 212 may be accessed. As a non-limiting example, if a focal color of the image is a dark red color, a model design may be accessed for the dark red color or a color similar to the dark red color. A model design, for example, may comprise an arrangement, spatial placement, color, and/or size of a frame, a moulding, a matboard, a glazing, a fillet, a liner, and/or other components. Similarly, the accent colors and the neutral colors may be used in determining respective parts of the model design such as the arrangement, spatial placement, material colors, and/or size of the frame, the moulding, the matboard, the glazing, the fillet, the liner, and/or other components.

According to the one or more custom designs identified in 2216, a plurality of mats may be identified in 2218, 2220, 2222, 2224, for each of a plurality of design styles such a monochromatic design shown in 2226, an achromatic design shown in 2228, a complimentary design shown in 2230, and/or a gallery design shown in 2232. For each of the design styles, a corresponding frame style may be selected in 2234, 2236, 2238, and/or 2240.

In 2242, a recommended expert design style may be generated utilizing at least the material or size identified in 2204, the art style identified in 2206, the colors identified in 2208, 2210, 2212, and 2214, and/or the custom designs identified in 2216. The recommendation design style generated by the virtual framing system 215 in 2242 may be displayed in 2244, for example, by encoding the recommended design style in one or more user interfaces 272 such as a network page or a mobile application. The user interface 272, or data used in generating the user interface, may be sent to the client device 206, such as a computer or mobile device, for rendering.

In 2246, a design style selected by the user via the user interface 272, may be obtained or otherwise accessed. In 2248, a visualization region may be generated comprising, for example, the arrangement, spatial placement, material colors, and/or size of the frame, the moulding, the matboard, the glazing, the fillet, the liner, and/or other components, determined (if applicable) according to the selected design style obtained in 2246. Subsequently, the visualization region may be encoded in a user interface 272 and sent to the client device 206 for display.

As may be appreciated, the user of the virtual framing system 215 may desire to make additional modifications to all or portions of the components used in generating the visualization region. Accordingly, in 2250, it may be determined whether the user has indicated to change a quantity of matboards. If so, a matboard quantity may be selected by the user in 2252 and accessed by the virtual framing system 215. The visualization region may be regenerated to reflect the change in matboard quantity, if applicable. In 2254, it may be determined whether the user has indicated that the user desires to proceed to a checkout process whereby a user may initiate a purchase of the item, as will be discussed in greater detail. If so, the virtual framing system 215 may end and proceed to a checkout process, as will be discussed in greater detail below.

Moving on to 2256, it may be determined whether the user has indicated to change a color of the one or more matboards. If so, a matboard color may be selected by the user in 2258 for each of the one or more matboards and may be accessed by the virtual framing system 215. The visualization region may be regenerated to reflect the change in matboard color, if applicable. In 2260, it may be determined whether the user has indicated that the user desires to proceed to a checkout process whereby a user may initiate a purchase of the item, as will be discussed in greater detail. If so, the virtual framing system 215 may end and proceed to a checkout process, as will be discussed in greater detail below.

Referring next to 2262, it may be determined whether the user has indicated to change one or more of the recommended frames. If so, a different frame may be selected by the user in 2264 and may be accessed by the virtual framing system 215. The visualization region may be regenerated to reflect the change in the frame, if applicable. In 2266, it may be determined whether the user has indicated that the user desires to proceed to a checkout process whereby a user may initiate a purchase of the item, as will be discussed in greater detail. If so, the virtual framing system 215 may end and proceed to a checkout process, as will be discussed in greater detail below.

Turning now to 2268, it may be determined whether the user has indicated to change a glazing of glass used in the frame and represented in the visualization region. If so, a different glazing may be selected by the user in 2270 and may be accessed by the virtual framing system 215. The visualization region may be regenerated to reflect the change in the glazing, if applicable. In 2272, it may be determined whether the user has indicated that the user desires to proceed to a checkout process whereby a user may initiate a purchase of the item, as will be discussed in greater detail. If so, the virtual framing system 215 may end and proceed to a checkout process, as will be discussed in greater detail below.

According to various embodiments, the frame, the art, and the decorative additions shown in the visualization region may be depicted relative to a room or other space, such as a living room or a dining room. In 2274, it may be determined whether the user has indicated to change a wall color surrounding the frame used in the visualization of the frame represented in the visualization region. If so, a custom wall color may be selected by the user in 2276 and may be accessed by the virtual framing system 215. The visualization region may be regenerated to reflect the change in the wall color, if applicable. In 2278, it may be determined whether the user has indicated that the user desires to proceed to a checkout process whereby a user may initiate a purchase of the item, as will be discussed in greater detail. If so, the virtual framing system 215 may end and proceed to a checkout process, as will be discussed in greater detail below.

Next, in 2280, it may be determined whether the user has indicated to a desire to view the frame, the art, and the decorative additions in a visualized image of a room. If so, a room style may be selected by the user in 2282 and may be accessed by the virtual framing system 215. The room style may be selected by the user, for example, by engaging a visual identifier representing a respective style of room. For example, a visual identifier (e.g., a picture) of a living room may be engaged by the user to generate a visualization region comprising the frame in the visualized living room, in 2284. According to various embodiments, a user may be provided with an option to upload a personal room setting to view the custom frame artwork(s) in the user's own environment. The virtual framing system 215 may generate a visualization of the room using, for example, one or more digital images provided by the user and allow the user to position the custom framed artwork(s) anywhere on the wall of the room. In addition, the room may be scaled appropriately automatically or at the direction of the user, so the custom frame size would be correct. The virtual framing system 215 may end and proceed to a checkout process, as will be discussed in greater detail below.

Figure 23:
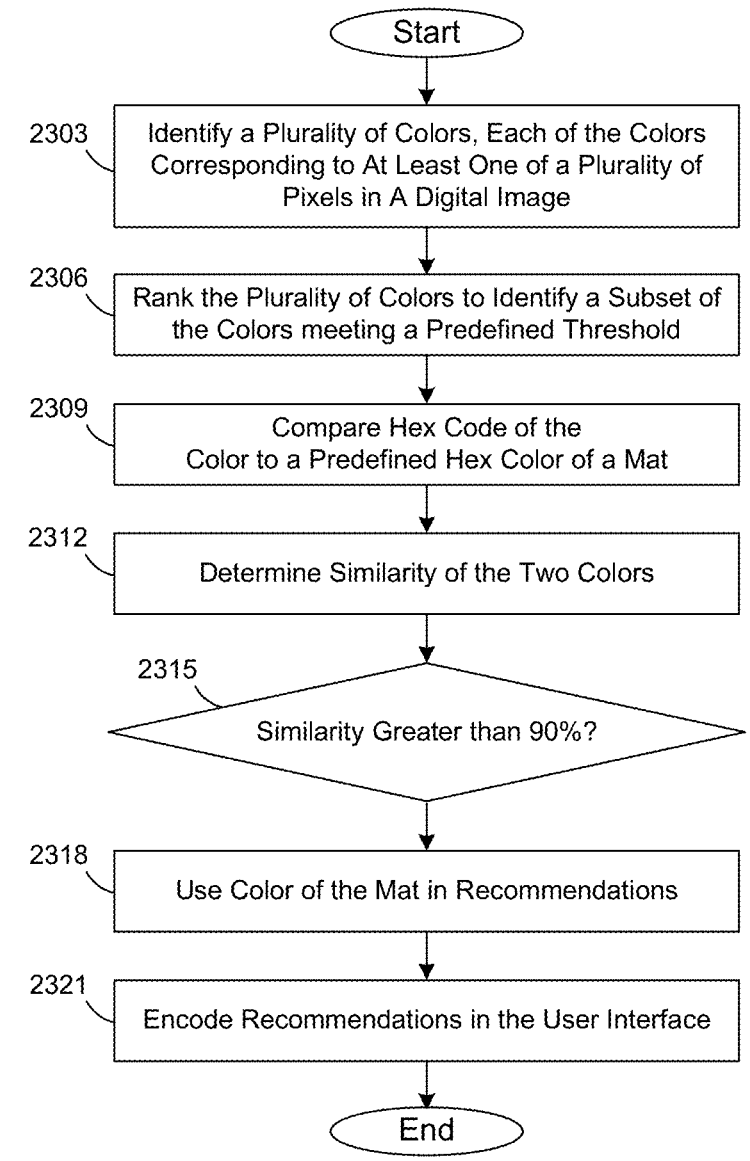

Turning now to FIG. 23, shown is a flowchart that provides one example of the operation of a portion of the virtual framing system 215 according to various embodiments. Specifically, the flowchart of FIG. 23 provides greater detail of identifying a mat, as set forth in 2218 (FIG. 22A), 2220 (FIG. 22A), 2222 (FIG. 22A), and 2224 (FIG. 22A). It is understood that the flowchart of FIG. 23 provides merely an example of the many different types of functional arrangements that may be employed to implement the operation of the portion of the virtual framing system 215 as described herein. As an alternative, the flowchart of FIG. 23 may be viewed as depicting an example of elements of a method implemented in the computing environment 203 (FIG. 2) according to one or more embodiments.

In 2303, the colors of the digital image may be detected by the virtual framing system 215. For example, the colors of the digital image may be examined on a pixel-by-pixel basis to identify unique colors located within the digital image. Next, in 2306, the colors identified in the digital image may be ranked to identify which of the plurality of colors meet a predefined threshold indicating which colors are the most relevant or dominant colors in the digital image. As a non-limiting example, the predefined threshold may be employed, for example, to identify the top-10 most predominant colors in the image determined by calculating a ratio of the top-10 colors relative to other colors in the image. As discussed above with respect to FIGS. 22A-B, by utilizing the most relevant colors of the digital image, the virtual framing system 215 may generate recommendations, such as expert design mat color recommendations, to be presented to the user.

In 2309, for each of the colors meeting the predefined threshold, the virtual framing system 215 may be operable to compare a hexadecimal code (hex code) of a respective color to a hex code for each of a plurality of predefined colors, for example, accessed from the data store 212. As a non-limiting example, the predefined colors may be a plurality of mat colors stored in the data store 212. Although the above-described comparison of the colors meeting the predefined threshold with the plurality of predefined colors utilizes hex codes, it is not so limited. For example, hue-saturation-light (HSL) codes and red-green-blue (RGB) codes may be implemented to determine a similarity between two colors, as shown in 2312.

As a non-limiting example, a first hex code of a dominant color of the digital image may be compared to a second hex code corresponding to a color of a mat accessed from the data store 212. The first hex code and the second hex code may each be converted into an RGB code and then into a HSL code to obtain a distance between the HSL codes by employing HSL color space distance calculation and/or International Commission on Illumination (CIE) color comparison. One or more weights may be used in the determination of the distance. For example, Table 1 depicts exemplary weights that may be used in the determination of a distance between two colors:

TABLE 1

Exemplary Weights Used in Determination of Color Distance

| | |
|---|---|
| Hue: | 55% |
| Saturation: | 40% |
| Lightness: | 5% |

However, the definition of the weights may vary, as may be appreciated. In 2315, it is determined whether the similarity (e.g., the distance) between two colors has a similarity greater than a predefined threshold (e.g., 90% as shown in FIG. 23). If so, in 2318, the color accessed from the data store (i.e., the ideal color) may be used in a recommendation of its corresponding mat. As shown in 2321, the one or more recommendations may be encoded in a user interface 272 (FIG. 2) for rendering by a client device 206 (FIG. 2).

Figure 24:
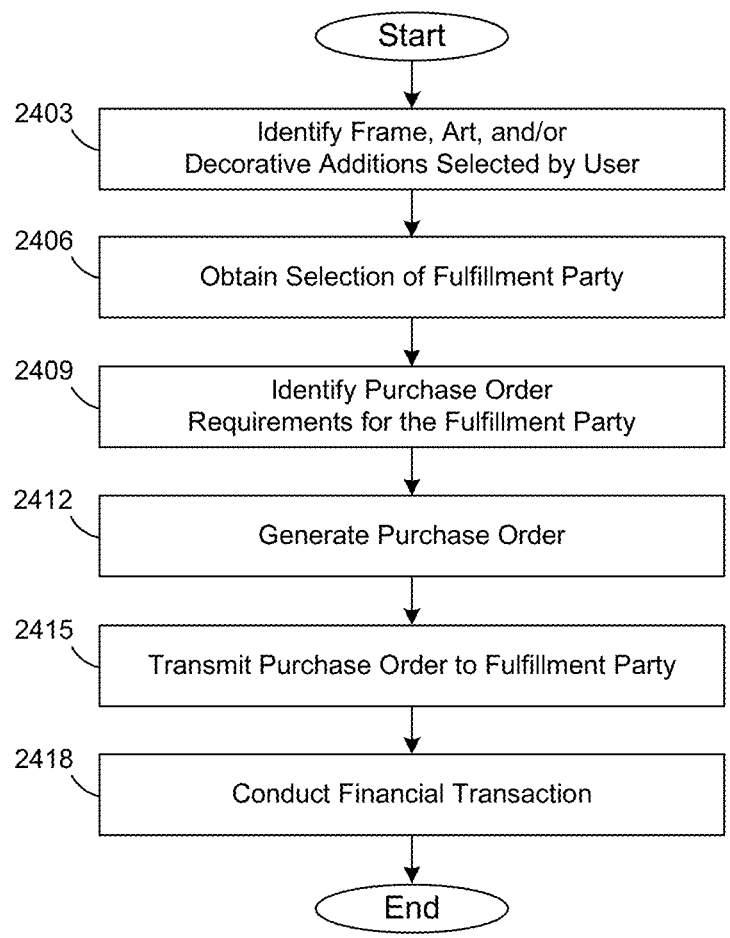

Turning now to FIG. 24, shown is a flowchart that provides one example of the operation of a portion of the virtual framing system 215 according to various embodiments. It is understood that the flowchart of FIG. 24 provides merely an example of the many different types of functional arrangements that may be employed to implement the operation of the portion of the virtual framing system 215 as described herein. As an alternative, the flowchart of FIG. 24 may be viewed as depicting an example of elements of a method implemented in the computing environment 203 (FIG. 2) according to one or more embodiments.

In box 2403, the frame, the art (or item enclosed via the frame), and any decorative additions (e.g., mouldings, matboards, glazings, fillets, liners, or other items) selected by the user via the user interfaces 272 described herein may be identified for use in generating a purchase order. As may be appreciated, various frame shops, or affiliate partners, may be capable of fulfilling the selections specified by the user. Thus, according to various embodiments, the user may be prompted to select a fulfillment party based on a proximity of the fulfillment party to the user and/or an estimated cost of the fulfillment. For example, the user may be prompted to provide a zip code in which the user resides. The virtual framing system 215 may determine the frame shops located within a certain distance of the zip code and may present a list of the frame shops to the user along with an estimate of the fulfillment for each of the frame shops. The user may be free to make his or her own selection and the selection may be received or otherwise accessed by the virtual framing system 215.

In 2409, it may be determined whether the selected fulfillment party has any requirements used in generating a purchase order. For example, the fulfillment party may request purchase orders be formatted according to certain requirements or constraints. Accordingly, the order requirements and constraints identified may be satisfied in generating the purchase order in 2412. In 2415, the purchase order may be transmitted to the fulfillment party along with any assets required, such as the digital image provided by the user. The purchase order may comprise, for example, the frame, the art, and/or the decorative additions as identified in 2403.

In 2418, a financial transaction may be conducted utilizing a payment gateway on behalf of the fulfillment party, if desired. Alternatively, the virtual framing system 215 may redirect the user to a payment gateway independent of the virtual framing system 215, such as, for example, the payment gateway operated by the fulfillment party.

Moving on to FIG. 25, shown is a table 2503 illustrating an exemplary weight methodology that may be employed by the virtual framing system 215 in generating recommendations according to various embodiments of the present disclosure. In the non-limiting example of FIG. 25, the weights illustrated in table 2503 may be utilized to generate recommendations to be surfaced or otherwise presented to a user. For example, a design quiz may be provided to a user prompting the user with a plurality of design choices, wherein selections (as well as the lack of selections) assists in determining design criteria noted in the "Design Criteria Tables" of FIGS. 25 and 26.

As a user selects particular design choices in the design quiz, more information may be determined about the user, such as a "sense of style" of the user as well as design preferences. Accordingly, based on the information provided by the user during the design quiz, the information may be weighted to determine recommendations for the user. As shown in FIG. 25, certain indications of styles provided by a user may be afforded more weight than indications of other styles. For example, in the "traditional" column, a weight of 3 may afford more weight to traditional style preferences indicated by the user as opposed to a weight of 1 for "contemporary transitional." Although shown with certain weights, the present disclosure is not so limited. For example, the weights may be predefined in the data store 212 by an administrator of the virtual framing system 215. Alternatively, in various embodiments, the weights may dynamically change by employing known machine learning algorithms such as the RETE pattern matching algorithm, the RETE pattern matching algorithm, and/or other machine learning strategies.

Referring next to FIG. 26, shown is a table 2603 illustrating an exemplary weight methodology that may be employed by the virtual framing system 215 in generating recommendations according to various embodiments of the present disclosure. In the non-limiting example of FIG. 26, the weights illustrated in table 2603 may be utilized to generate recommendations to be surfaced or otherwise presented to a user. For example, as the user progresses through the series of user interfaces 272 (e.g., FIGS. 3-20), the information provided by a user may be used in determining recommendations based on determined preferences for the user.

As a user selects particular design choices utilizing the user interfaces 272, more information may be determined about the user, such as a "sense of style" of the user as well as design preferences for the user. Accordingly, based on the information provided by the user during the progression of the user interfaces 272, the information may be weighted to determine recommendations for the user. As shown in FIG. 26, certain indications of styles provided by a user may be afforded more weight than indications of other styles. For example, the size of a digital image provided by the user with a weight of 10 may afford more weight than a genre of the image indicated by the user having a weight of 9. Although FIG. 26 is shown with certain weights, the present disclosure is not so limited. For example, the weights may be predefined in the data store 212 by an administrator of the virtual framing system 215. Alternatively, in various embodiments, the weights may dynamically change by employing known machine learning algorithms such as the RETE pattern matching algorithm, the RETE pattern matching algorithm, and/or other machine learning strategies.

FIGS. 27-29 are drawings depicting pseudo-code that may be employed by the virtual framing system in generating recommendations according to various embodiments of the present disclosure. For example, an implementation of pseudo-code of FIGS. 27-29 may comprise code set forth in an application, such as the virtual framing system 215, the color detection engine 219, the recommendation generator 221, and/or the export application 224 that, when executed, causes a processor of a computing device to perform various actions.

Figure 30:
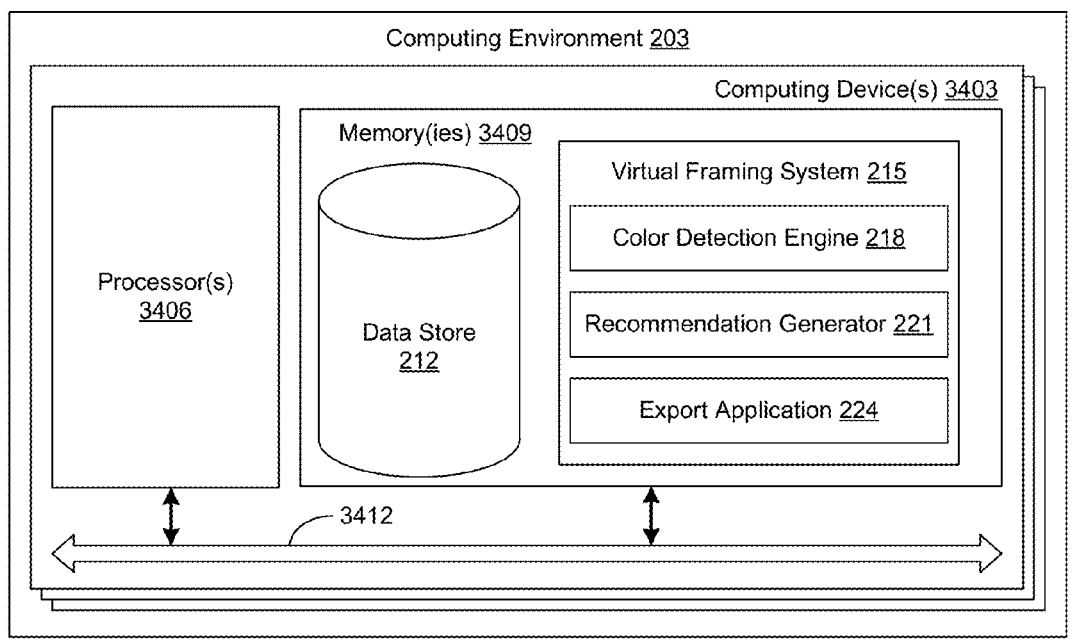
FIG. 30 is a schematic block diagram that provides one example illustration of a computing environment employed in the networked environment of FIG. 2 according to various embodiments of the present disclosure.

With reference to FIG. 30, shown is a schematic block diagram of the computing environment 203 according to an embodiment of the present disclosure. The computing environment 203 includes one or more computing devices 3003. Each computing device 3003 includes at least one processor circuit, for example, having a processor 3006 and a memory 3009, both of which are coupled to a local interface 3012. To this end, each computing device 3003 may comprise, for example, at least one server computer or like device. The local interface 3012 may comprise, for example, a data bus with an accompanying address/control bus or other bus structure as can be appreciated.

Stored in the memory 3009 are both data and several components that are executable by the processor 3006. In particular, stored in the memory 3009 and executable by the processor 3006 are the virtual framing system 215, the color detection engine 219, the recommendation generator 221, the export application 224, and potentially other applications. Also stored in the memory 3009 may be a data store 212 and other data. In addition, an operating system may be stored in the memory 3009 and executable by the processor 3006.

It is understood that there may be other applications that are stored in the memory 3009 and are executable by the processor 3006 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 3009 and are executable by the processor 3006. In this respect, the term "executable" means a program file that is in a form that can ultimately be run by the processor 3006. Examples of executable programs may be, for example, a compiled program that can be translated into machine code in a format that can be loaded into a random access portion of the memory 3009 and run by the processor 3006, source code that may be expressed in proper format such as object code that is capable of being loaded into a random access portion of the memory 3009 and executed by the processor 3006, or source code that may be interpreted by another executable program to generate instructions in a random access portion of the memory 3009 to be executed by the processor 3006, etc. An executable program may be stored in any portion or component of the memory 3009 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 3009 is defined herein as including both volatile and nonvolatile memory and data storage components. Volatile components are those that do not retain data values upon loss of power. Nonvolatile components are those that retain data upon a loss of power. Thus, the memory 3009 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 3006 may represent multiple processors 3006 and/or multiple processor cores and the memory 3009 may represent multiple memories 3009 that operate in parallel processing circuits, respectively. In such a case, the local interface 3012 may be an appropriate network that facilitates communication between any two of the multiple processors 3006, between any processor 3006 and any of the memories 3009, or between any two of the memories 3009, etc. The local interface 3012 may comprise additional systems designed to coordinate this communication, including, for example, performing load balancing. The processor 3006 may be of electrical or of some other available construction.

Although the virtual framing system 215, the color detection engine 219, the recommendation generator 221, the export application 224, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 22-24 show the functionality and operation of an implementation of portions of the virtual framing system 215. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 3006 in a computer system or other system. The machine code may be converted from the source code, etc. If embodied in hardware, each block may represent a circuit or a number of interconnected circuits to implement the specified logical function(s).

Although the flowcharts of FIGS. 22-24 show a specific order of execution, it is understood that the order of execution may differ from that which is depicted. For example, the order of execution of two or more blocks may be scrambled relative to the order shown. Also, two or more blocks shown in succession in FIGS. 22-24 may be executed concurrently or with partial concurrence. Further, in some embodiments, one or more of the blocks shown in FIGS. 22-28 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the virtual framing system 215, the color detection engine 219, the recommendation generator 221, the export application 224, that comprises software or code can be embodied in any non-transitory computer-readable medium for use by or in connection with an instruction execution system such as, for example, a processor 3006 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the virtual framing system 215, the color detection engine 219, the recommendation generator 221, the export application 224, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 3003, or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying program code executable in at least one computing device, that, when executed by the at least one computing device, causes the at least one computing device to:

access a digital image according to a user input provided by a user of a client device;

identify a plurality of colors in the digital image, wherein each of the colors correspond to at least one of a plurality of pixels in the digital image;

rank the plurality of colors and identify a subset of the plurality of colors meeting a predefined threshold, wherein the predefined threshold is configurable by an administrator to identify a plurality of most relevant colors, wherein the ranking is determined by comparing the plurality of colors to a predefined template accessed in memory;

generate a recommendation according to the subset of the plurality of colors and based at least in part on a companion relationship between two of a group consisting of a moulding, a matboard, a glazing, a fillet, and a liner, wherein the recommendation comprises at least a portion of the subset of the plurality colors to recommend to the user during a virtual framing process;

encode the recommendation in a user interface;

cause the user interface to be transmitted to the client device for rendering, wherein a region of the user interface comprises a virtual room generated utilizing a second digital image of a room, wherein the region of the user interface further comprises one or more customized virtual frames corresponding to the selection of the at least a portion of the subset of the plurality of colors meeting the predefined threshold within the virtual room, wherein the virtual room is generated by scaling the second digital image of the room in association with the one or more customized virtual frames;

receive a selection of at least a portion of the subset of the plurality of colors meeting the predefined threshold;

perform an automatic determination of at least one of a plurality of fulfillment centers to fulfill an order comprising at least the recommendation;

programmatically generate an order document according to the automatic determination; and cause the purchase order document to be transmitted to the at least one of the plurality of fulfillment centers identified in the automatic determination.

2. The non-transitory computer-readable medium of claim 1, further comprising program code that, when executed, causes the at least one computing device to provide a three-dimensional interaction with the virtual room when engaged in the user interface.

3. The non-transitory computer-readable medium of claim 1, further comprising program code that, when executed, causes the at least one computing device to generate a machine-readable visual identifier for placement in a respective portion of a customized virtual frame, wherein the machine-readable visual identifier is generated to initiate access to a web service upon an identification of the machine-readable visual identifier by a device, wherein the placement of the machine-readable visual identifier is further employed in the generation of the purchase order document.

4. The non-transitory computer-readable medium of claim 1, further comprising program code that, when executed, causes the at least one computing device to receive information obtained by the user according to a selection in a design style quiz to determine a design criteria for the user, wherein the design criteria is determined according to a plurality of weights for the selection.

5. The non-transitory computer-readable medium of claim 1, further comprising program code that, when executed, causes the at least one computing device to:
access a second selection received of at least a portion of the subset of the plurality of colors meeting the predefined threshold; and
generate a visualization region in the user interface, wherein the visualization region comprises at least the digital image and the second selection of the at least a portion of the subset of the plurality of colors.

6. The non-transitory computer-readable medium of claim 1, wherein the client device is selected from a group consisting of a desktop computer, a tablet computing device, a mobile computing device, a television, a scrolling marquee device, and a kiosk computing device.

7. The non-transitory computer-readable medium of claim 1, wherein the recommendation is further generated utilizing meta data from a header of the digital image.

8. A system, comprising:
at least one computing device; and
program instructions executed in the at least one computing device that, when executed by the at least one computing device, cause the at least one computing device to:
access a digital image according to a user input provided by a user of a client device;
identify a plurality of colors in the digital image, wherein each of the colors correspond to at least one of a plurality of pixels in the digital image;
rank the plurality of colors and identify a subset of the plurality of colors meeting a predefined threshold, wherein the predefined threshold is configurable by an administrator to identify a plurality of most relevant colors, wherein the ranking is determined by comparing the plurality of colors to a predefined template accessed in memory;
generate a recommendation according to the subset of the plurality of colors and based at least in part on a companion relationship between two of a group consisting of a moulding, a matboard, a glazing, a fillet, and a liner, wherein the recommendation comprises at least a portion of the subset of the plurality colors to recommend to the user;
encode the recommendation in a user interface, wherein the user interface comprises a region having a virtual room generated utilizing a second digital image of a room, wherein the region of the user interface further comprises one or more customized virtual frames corresponding to the selection of the at least a portion of the subset of the plurality of colors meeting the predefined threshold within the virtual room, wherein the virtual room is generated by scaling the second digital image of the room in association with the one or more customized virtual frames;
cause the user interface to be transmitted to the client device for rendering;
access a selection of at least a portion of the subset of the plurality of colors meeting the predefined threshold received from the client device;
perform an automatic determination of at least one of a plurality of fulfillment centers to fulfill an order comprising at least the recommendation;
generate a purchase order document according to the automatic determination; and
cause the purchase order document to be transmitted to the at least one of the plurality of fulfillment centers identified in the automatic determination.

9. The system of claim 8, further comprising program instructions that, when executed by the at least one computing device, cause the at least one computing device to provide a three-dimensional interaction with the virtual room when engaged in the user interface.

10. The system of claim 8,
further comprising program instructions that, when executed by the at least one computing device, cause the at least one computing device to receive information obtained from the user according to a selection in a design style quiz to determine a design criteria for the user, wherein the design criteria is determined according to a plurality of weights for the selection.

11. The system of claim 8,
further comprising program instructions that, when executed by the at least one computing device, cause the at least one computing device to generate a machine-readable visual identifier for placement in a respective portion of a customized virtual frame, wherein the machine-readable visual identifier is generated to initiate access to a web service upon an identification of the machine-readable visual identifier by a device, wherein the placement of the machine-readable visual identifier is further employed in the generation of the purchase order document.

12. The system of claim 8, wherein the recommendation is further generated utilizing meta data from a header of the digital image.

13. The system of claim 8, further comprising program instructions that, when executed by the at least one computing device, cause the at least one computing device to:
receive a second selection of at least a portion of the subset of the plurality of colors meeting the predefined threshold; and
generate a visualization region in the user interface, wherein the visualization region comprises at least the digital image and the second selection of the at least a portion of the subset of the plurality of colors.

14. The system of claim 8, wherein the client device is selected from a group consisting of a desktop computer, a tablet computing device, a mobile computing device, a television, and a kiosk computing device.

15. A method, comprising:
accessing, by at least one computing device comprising at least one hardware processor, a digital image according to a user input provided by a user of a client device during an electronic framing process to generate one or more customized virtual frames;
identifying, by the at least one computing device, a plurality of colors in the digital image, wherein each of the colors correspond to at least one of a plurality of pixels in the digital image;
ranking, by the at least one computing device, the plurality of colors and identifies a subset of the plurality of colors meeting a predefined threshold, wherein the predefined threshold is configurable by an administrator to identify a plurality of most relevant colors, wherein the ranking is determined by comparing the plurality of colors to a predefined template accessed in memory;
generating, by the at least one computing device, a recommendation according to the subset of the plurality of colors and based at least in part on a companion relationship between two of a group consisting of a moulding, a matboard, a glazing, a fillet, and a liner wherein the recommendation comprises at least a portion of the subset of the plurality colors to recommend to the user;

encoding, by the at least one computing device, the recommendation in a user interface, wherein a region of the user interface comprises a virtual room generated utilizing a second digital image of a room, wherein the region of the user interface further comprises one or more customized virtual frames corresponding to the selection of the at least a portion of the subset of the plurality of colors meeting the predefined threshold within the virtual room, wherein the virtual room is generated by scaling the second digital image of the room in association with the one or more customized virtual frames;

sending, by the at least one computing device, the user interface to the client device for rendering;

receiving, by the at least one computing device, a selection of at least a portion of the subset of the plurality of colors meeting the predefined threshold;

performing, by the at least one computing device, an automatic determination of at least one of a plurality of fulfillment centers to fulfill an order comprising at least the recommendation;

generating, by the computing device, a purchase order document according to the automatic determination; and transmitting, by the computing device, the purchase order document to the at least one of the plurality of fulfillment centers identified in the automatic determination.

16. The method of claim 15, wherein the recommendation is further generated utilizing meta data from a header of the digital image.

17. The method of claim 15, further comprising accessing, by the at least one computing device, information obtained from the user according to a selection in a design style quiz to determine a design criteria for the user, wherein the design criteria is determined according to a plurality of weights for the selection.

18. The method of claim 15, wherein the region of the user interface is configured to provide a three-dimensional interaction with the virtual room when engaged by the user.

19. The method of claim 15, wherein the client device is selected from a group consisting of a desktop computer, a tablet computing device, a mobile computing device, a television, and a kiosk computing device.

20. The method of claim 15, further comprising generating, by the at least one computing device, a machine-readable visual identifier for placement in a respective portion of a customized virtual frame, wherein the machine-readable visual identifier is generated to initiate access to a web service upon an identification of the machine-readable visual identifier by a device, wherein the placement of the machine-readable visual identifier is further employed in the generation of the purchase order document.

21. The method of claim 15, wherein the purchase order document further comprises a selection of a LED device via the user interface.

22. The method of claim 15, wherein the client device further comprises a mobile computing device and the digital image is accessed from a mobile application executable on the mobile computing device.

23. The method of claim 15, wherein the client device further comprises a marquee device configured to display, utilizing audio or video in association with the user interface, at least one of a group consisting of an advertising for a plurality of predefined custom frame combinations, a tutorial for a plurality of best design concepts, and advertising for a plurality of new product designs.

* * * * *